United States Patent
Ohgushi

(10) Patent No.: US 8,203,293 B2
(45) Date of Patent: Jun. 19, 2012

(54) MOTOR DRIVE APPARATUS AND MOTOR DRIVE METHOD

(75) Inventor: Toshiaki Ohgushi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 281 days.

(21) Appl. No.: 12/727,515

(22) Filed: Mar. 19, 2010

(65) Prior Publication Data
US 2011/0031909 A1 Feb. 10, 2011

(30) Foreign Application Priority Data
Aug. 6, 2009 (JP) ................................ 2009-183626

(51) Int. Cl.
*H02P 21/00* (2006.01)

(52) U.S. Cl. .............. 318/400.02; 318/400.32; 318/811; 318/798

(58) Field of Classification Search ............. 318/400.01, 318/400.02, 400.04, 400.32, 400.33, 400.34, 318/400.35, 400.36, 798–800, 802, 805, 318/807–811, 599
See application file for complete search history.

(56) References Cited

U.S. PATENT DOCUMENTS

| | | | |
|---|---|---|---|
| 4,780,657 A * | 10/1988 | Brown et al. | 318/805 |
| 5,652,495 A * | 7/1997 | Narazaki et al. | 318/716 |
| 5,909,018 A * | 6/1999 | Vecchiotti et al. | 187/393 |
| 6,885,970 B2 * | 4/2005 | Petrovic et al. | 702/169 |
| 2003/0030404 A1 * | 2/2003 | Iwaji et al. | 318/700 |
| 2009/0256503 A1 * | 10/2009 | Ueda et al. | 318/400.02 |
| 2009/0322262 A1 * | 12/2009 | Tobari et al. | 318/400.02 |
| 2010/0139333 A1 * | 6/2010 | Maekawa et al. | 68/212 |
| 2011/0025238 A1 * | 2/2011 | Ueda et al. | 318/400.02 |
| 2011/0298403 A1 * | 12/2011 | Yamamoto et al. | 318/400.02 |

FOREIGN PATENT DOCUMENTS

| | | |
|---|---|---|
| JP | 07-087771 | 3/1995 |
| JP | 2002-281782 | 9/2002 |
| JP | 2002-339999 | 11/2002 |

* cited by examiner

*Primary Examiner* — Eduardo Colon Santana
(74) *Attorney, Agent, or Firm* — Turocy & Watson, LLP

(57) ABSTRACT

The motor drive apparatus to perform vector control having excellent control performance on a motor includes an A/D converter which acquires currents flowing through a u-phase, a v-phase and a w-phase of the motor, a vector control unit which performs vector control on the motor based on d-axis motor current and q-axis motor current acquired by coordinate-converting the digitalized currents, a motor parameter and a desired angular speed of a motor rotor, a PWM generator which generates a PWM signal to drive the motor based on a motor voltage acquired by the vector control unit, and a parameter estimation unit which estimates a motor resistance, a d-axis motor inductance and a q-axis motor inductance in a direct current excitation state based on maximum peak values and minimum peak values of a d-axis motor voltage and a q-axis motor voltage and estimates a motor inductive voltage constant in a forced commutation control state.

20 Claims, 18 Drawing Sheets

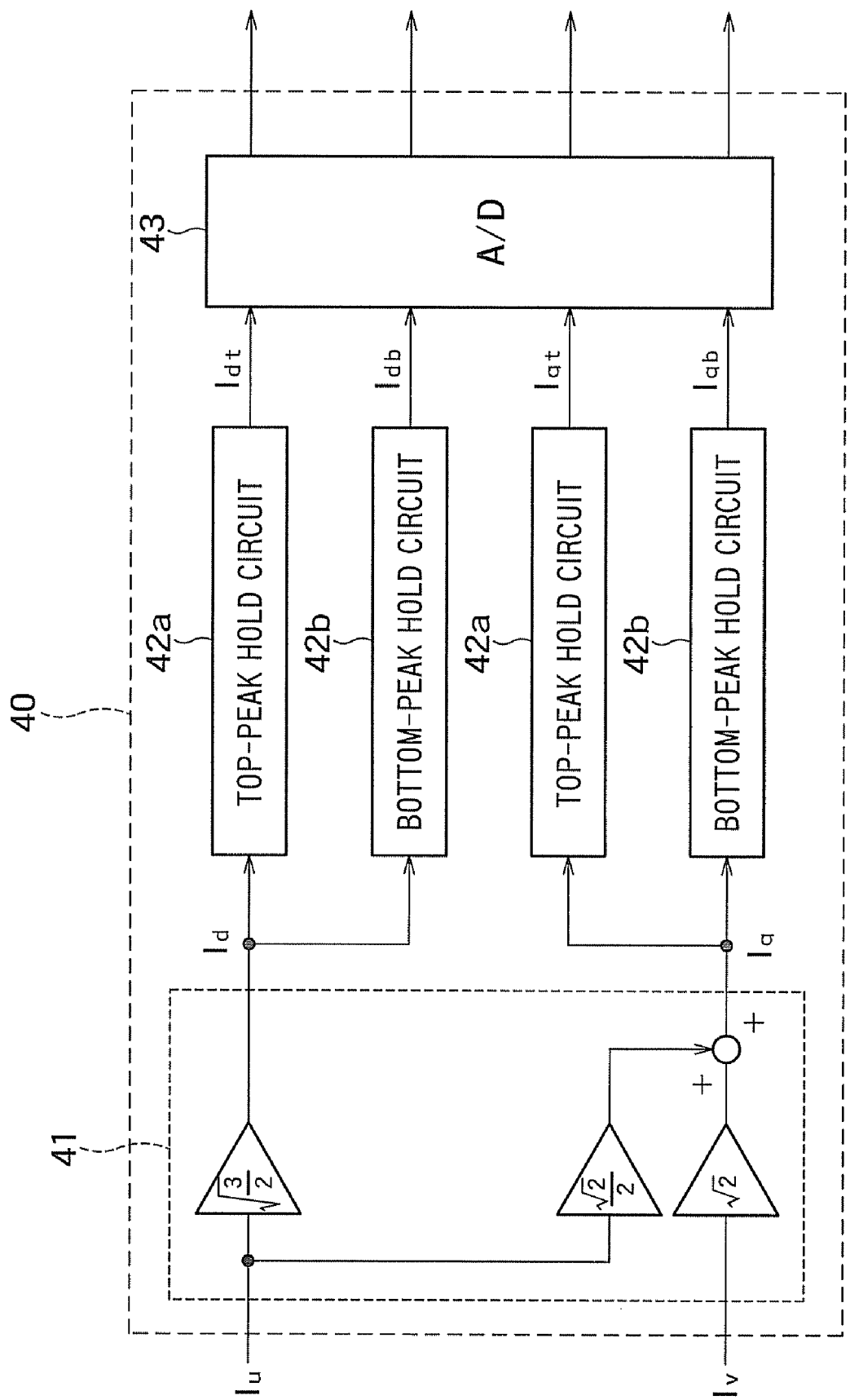
F I G. 5

(1)

MOTOR DRIVE APPARATUS AND MOTOR DRIVE METHOD

CROSS-REFERENCE TO RELATED APPLICATION

This application is based upon and claims the benefit of priority from prior Japanese Patent Application No. 2009-183626, filed on Aug. 6, 2009, the entire contents of which are incorporated herein by reference.

BACKGROUND OF THE INVENTION

1. Field of the Invention

The present invention relates to a motor drive apparatus and a motor drive method, and more specifically, relates to a motor drive apparatus and a motor drive method to perform vector control without using a position sensor.

2. Background Art

Recently, as the demand for carbon dioxide emission reduction and the like are growing, more energy-saving feature of, for example, household electrical appliances has been strongly required. Among the household electric appliances, the proportion of air-conditioners, refrigerators and washing machines to the total consumed electrical energy is large. Accordingly, it is important to reduce power consumption of motors mounted on these products.

Under such circumstances, a vector control method without using a position sensor where vector control capable of reducing power consumption is combined with drive control without using a position sensor while estimating a rotation speed and a rotation position of a rotor has been receiving attention. Since the control method does not require a position sensor such as a Hall sensor, miniaturization may be achieved. Accordingly, the method is advantageous in terms of its capability of being adopted to applications where a position sensor is difficult to be attached due to high temperature and high pressure such as the inside of a compressor.

However, conventionally, in the vector control motor without using a position sensor, values loaded at the time of manufacturing have been utilized as motor parameters (i.e., a motor coil resistance, a motor coil inductance and a motor inductive voltage constant). Therefore, it has been unavoidable to be impacted by variations of the motor parameters due to manufacturing variation, temperature, aging deterioration and the like.

By the way, a motor speed and position estimation apparatus to estimate a motor speed and a motor position is disclosed in Japanese Patent Application Laid-open No. 1995-87771. However, the apparatus is not designed for a vector control motor without using a position sensor. Further, a motor inductance cannot be estimated with this apparatus.

SUMMARY OF THE INVENTION

The first embodiment of the present invention provides a motor drive apparatus to perform vector control of a motor which includes a stator having a u-phase coil, a v-phase coil and a w-phase coil and a rotor having a permanent magnet fixed thereto, including: an A/D converter which acquires a first motor current constituted with a u-phase motor current, a v-phase motor current and a w-phase motor current flowing respectively through the u-phase coil, the v-phase coil and the w-phase coil, and which respectively digitalizes the u-phase motor current, the v-phase motor current and the w-phase motor current; a vector control unit which generates a second motor current constituted with a d-axis motor current and a q-axis motor current by performing coordinate conversion to convert from a uvw-coordinate system into a dq-coordinate system on the first motor current digitalized by the A/D converter; and which acquires a first motor voltage constituted with a d-axis motor voltage and a q-axis motor voltage based on the second motor current, a motor parameter, and a desired angular speed of the rotor; and which generates a second motor voltage constituted with a u-phase motor voltage, a v-phase motor voltage and a w-phase motor voltage by performing reverse conversion of the first coordinate conversion on the first motor voltage, the motor parameter including a motor resistance, a d-axis motor inductance, a q-axis motor inductance and a motor inductive voltage constant; a PWM generator which generates a PWM signal for driving the motor based on the second motor voltage acquired by the vector control unit; and a parameter estimation unit which estimates the motor resistance, the d-axis motor inductance and the q-axis motor inductance based on a maximum peak value and a minimum peak value of the d-axis motor current and a maximum peak value and a minimum peak value of the q-axis motor current in a direct current excitation control state where the rotor of the motor is fixed at a predetermined rotor angle; and which estimates the motor inductive voltage constant based on a predetermined angular speed, the motor resistance, the d-axis motor inductance and the q-axis motor inductance in a forced commutation control state where the rotor of the motor is rotating at the predetermined angular speed; and which loads the estimated motor parameter to the vector control unit.

The second embodiment of the present invention provides a drive method of a motor which includes a stator having a u-phase coil, a v-phase coil and a w-phase coil and a rotor having a permanent magnet fixed thereto, including: performing direct current excitation control to fix the rotor of the motor at a predetermined rotor angle; estimating a motor resistance, a d-axis motor inductance and a q-axis motor inductance during the direct current excitation control based on a maximum peak value and a minimum peak value of a d-axis motor current and a maximum peak value and a minimum peak value of a q-axis motor current; performing forced commutation control to rotate the rotor at a predetermined angular speed; estimating a motor inductive voltage constant during the forced commutation control based on the predetermined angular speed, the motor resistance, the d-axis motor inductance and the q-axis motor inductance; and performing vector control of the motor by using a motor parameter which is constituted with the motor resistance, the d-axis motor inductance, the q-axis motor inductance and the motor inductive voltage constant which are estimated.

BRIEF DESCRIPTION OF THE DRAWINGS

FIG. 5 is a view which illustrates configuration of a peak value output circuit in the case of rotor angle 0°;

FIG. 11 is a view which illustrates time waveforms of a motor current according to the fourth modified example of the present invention while FIG. 11(a) illustrates a time waveform in the case without the amplification circuit according to the fourth modified example of the present invention and FIG. 11(b) illustrates a time waveform in the case with the amplification circuit according to the fourth modified example of the present invention;

FIG. 16 is a view for describing the seventh modified example of the present invention while FIG. 16(a) is a view illustrating an example of rotor angle dependency of a motor inductance value and FIG. 16(b) is a view illustrating relation between combination of duty ratios of PWM signals and rotor angle;

FIG. 18 is a view for describing relation between a rotor and a stator of a motor while FIG. 18(a) is a view illustrating relation between uvw-coordinates and dq-coordinates and FIG. 18(b) is a view illustrating relation between a permanent magnet (i.e., the rotor) and respective d-axis and q-axis.

DETAILED DESCRIPTION OF THE INVENTION

Before describing an embodiment according to the present invention, the logic of devising the present invention by the inventor will be described.

Figure 18:
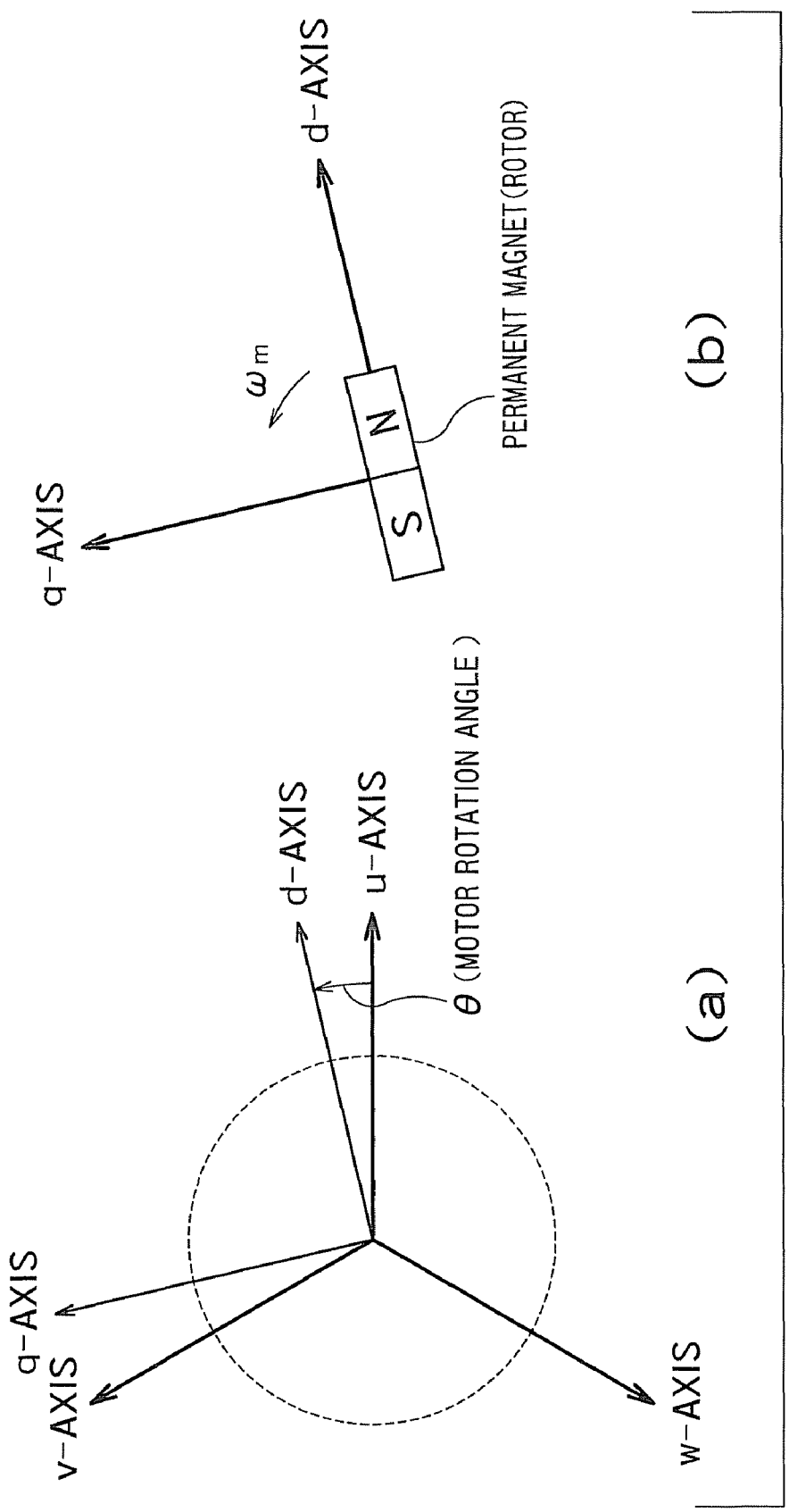

Hereinafter, a motor drive apparatus to perform vector control without using a position sensor according to a comparative example to the present invention will be described. Here, in the following description, u-axis, v-axis and w-axis are defined respectively along directions of a u-phase coil, a v-phase coil and a w-phase coil, as illustrated in FIG. 18(a). Further, as illustrated in FIG. 18(b), d-axis is defined in the direction from the south pole to the north pole of a permanent magnet which is fixed to a rotor of a motor, and q-axis is defined to be perpendicular to the d-axis. A rotor angle θ denotes the angle between d-axis and u-axis.

Using expression (1), the motor drive apparatus performs coordinate conversion (i.e., absolute conversion) of a motor current (i.e., a coil current) of the uvw-coordinate system, namely, a u-phase motor current $I_u$ flowing through the u-phase coil, a v-phase motor current $I_v$ flowing through the v-phase coil and a w-phase motor current $I_w$ flowing through the w-phase coil, into the dq-coordinate system. Thus, a d-axis motor current $I_d$ and a q-axis motor current $I_q$ are acquired.

$$\begin{pmatrix} d \\ q \end{pmatrix} = \sqrt{\frac{2}{3}} \begin{pmatrix} \cos\theta & \sin\theta \\ -\sin\theta & \cos\theta \end{pmatrix} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} u \\ v \\ w \end{pmatrix} \quad (1)$$

Here, θ denotes the rotor angle, which is estimated by utilizing a known technology without a position sensor.

Next, a d-axis motor voltage $V_d$ and a q-axis motor voltage $V_q$ which satisfy a desired angular speed $\omega_m$ of the rotor are acquired using a motor voltage equation of expression (2).

$$\begin{pmatrix} V_d \\ V_q \end{pmatrix} = \begin{pmatrix} R + \frac{d}{dt}L_d & -\omega_m L_q \\ \omega_m L_d & R + \frac{d}{dt}L_q \end{pmatrix} \begin{pmatrix} I_d \\ I_q \end{pmatrix} + \omega_m K_e \begin{pmatrix} 0 \\ 1 \end{pmatrix} \quad (2)$$

Here, $I_d$ denotes the d-axis motor current, $V_d$ denotes the d-axis motor voltage, $L_d$ denotes a d-axis motor inductance, $I_q$ denotes a q-axis motor current, $V_q$ denotes the q-axis motor voltage, $L_q$ denotes the q-axis motor inductance, R denotes a motor resistance, $\omega_m$ denotes the angular speed, and $K_e$ denotes motor inductive voltage constant.

Subsequently, coordinate conversion (i.e., absolute conversion) of the dq-coordinate system into the uvw-coordinate system is performed using expression (3). As can be seen from expression (3) and expression (1), this coordinate conversion is the inversion of the coordinate conversion expressed by expression (1). Accordingly, a u-phase motor voltage $V_u$, a v-phase motor voltage $V_v$ and a w-phase motor voltage $V_w$ are acquired from the d-axis motor voltage $V_d$ and the q-axis motor voltage $V_q$.

$$\begin{pmatrix} u \\ v \\ w \end{pmatrix} = \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} \cos\theta & -\sin\theta \\ \sin\theta & \cos\theta \end{pmatrix} \begin{pmatrix} d \\ q \end{pmatrix} \quad (3)$$

In order to actualize the motor voltages $V_u$, $V_v$, and $V_w$, acquired as described above, the motor drive apparatus generates three PWM signals having respective duty ratios $D_u$, $D_v$, and $D_w$, and then, drives each phase (i.e., the u-phase, the v-phase and the w-phase) of the motor based on these PWM signals.

As described above, in the vector control, the motor voltages ($V_d$ and $V_q$) are acquired by substituting the motor parameters (R, $L_d$, $L_i$, and $K_e$), the motor currents ($I_d$ and $I_q$) and the desired angular speed ($\omega_m$) into the motor voltage equation (i.e., expression (2)). Then, the motor is controlled based on the motor voltage ($V_d$ and $V_q$), so that the motor is driven at the desired angular speed.

As can be understood with the above description, in the vector control, the motor parameters need to be loaded, in advance, to the motor drive apparatus in order to acquire the motor voltage using the motor voltage equation of expression (2).

However, parameters could slightly vary due to manufacturing variations with actual motors. In addition, there is a possibility that parameter vary in accordance with variation of temperature, a source voltage and the like. In the case that a gap between the loaded parameters and actual parameters occurs due to the above factors, the motor cannot be accurately controlled. That is, control performance is decreased.

The present invention is devised based on the abovementioned unique technical observation of the inventor. As described in the following embodiment, the present invention solves the prospective problem that the motor may not be accurately controlled in the case that a gap between the parameters loaded to the motor drive apparatus and the actual parameters.

More specifically, in the motor drive apparatus to perform the vector control without using a position sensor, position of the rotor of the motor is determined by performing direct current excitation control at the time of starting. Then, a part of the motor parameters (R, $L_d$, and $L_q$) are estimated based on the maximum peak value and the minimum peak value of the motor current during that time. Next, the rotor is rotated at a predetermined angular speed by performing forced commutation control. Then, the rest of the parameter ($K_e$) is estimated using the motor current and the motor voltage during that time and a part of the previously acquired motor parameters. Subsequently, the vector control is performed using the estimated motor parameters. In this manner, the vector control can be performed using the updated motor parameters.

In the following, an embodiment according to the present invention will be described with reference to the drawings. Here, the same numeral is given to the structural element having a similar function and detailed description will not be repeated.

Hereafter, the motor drive apparatus according to the embodiment of the present invention will be described.

Figure 1:
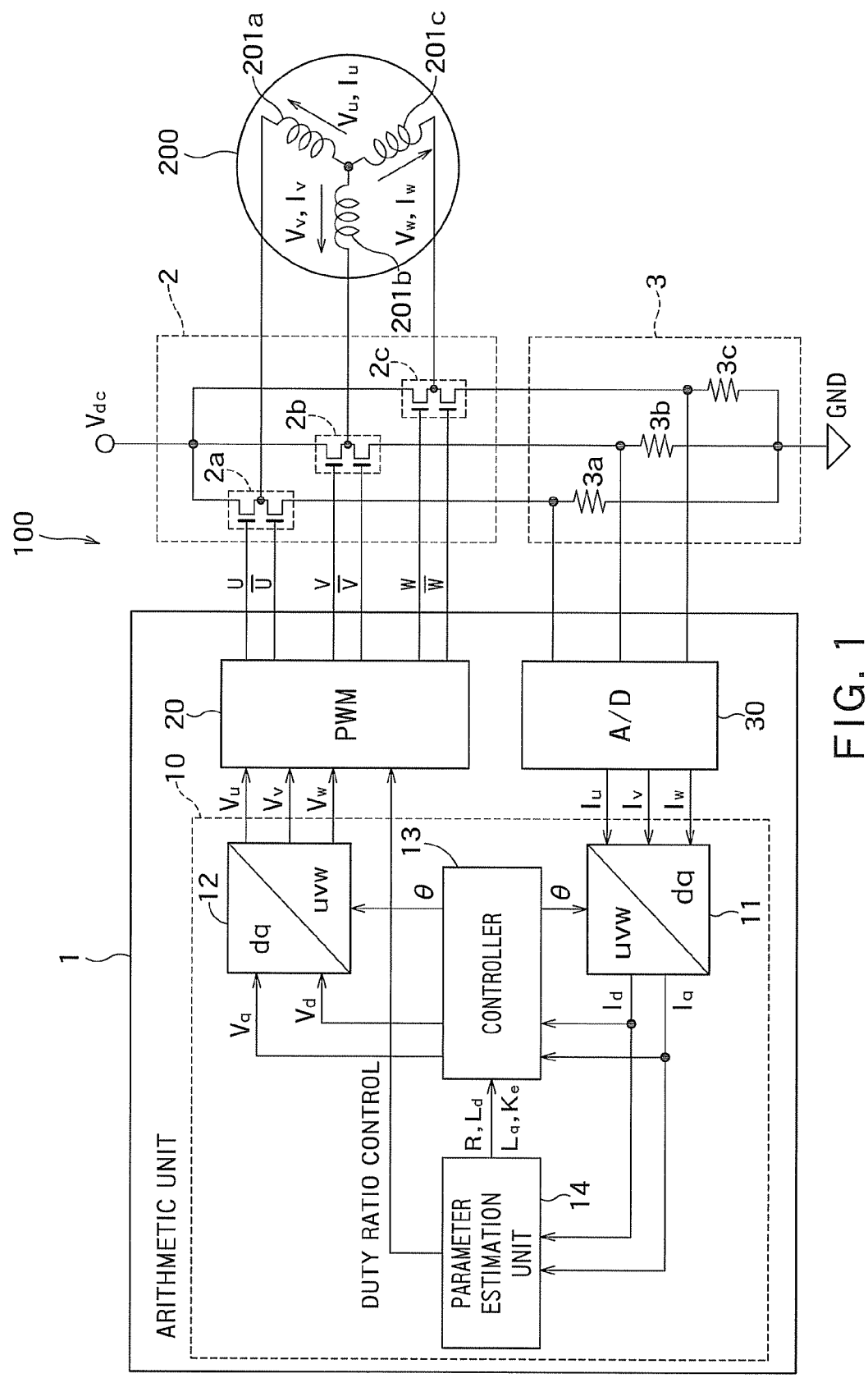
FIG. 1 is a view which illustrates the configuration of a motor drive apparatus according to an embodiment of the present invention.

FIG. 1 illustrates a motor drive apparatus 100 according to the present embodiment and a motor 200. The motor drive apparatus 100 is provided with a vector control unit 1, an inverter circuit 2 and a motor current detection circuit 3.

As can be seen from FIGS. 1, 18(a) and 18(b), the motor 200 is a three-phase permanent magnet synchronous motor (also called a permanent magnet motor (i.e., a PM motor)) having a stator to which a u-phase coil 201a, a v-phase coil 201b and a w-phase coil 201c are arranged and a rotor to which a permanent magnet is arranged.

The vector control unit 1 includes an arithmetic unit 10, a PWM generator 20 and an A/D converter 30. The vector control unit 1 is preferably mounted on a digital signal processor (DSP) or a microcomputer.

The inverter circuit 2 includes an inverter 2a, an inverter 2b and an inverter 2c which respectively drive the u-phase, the v-phase and the w-phase of the motor 200. As can be seen from FIG. 1, each of the inverters 2a, 2b, and 2c is constituted with two switches which are serially connected. For example, an insulated gate bipolar transistor (IGBT) or an n-type metal-oxide semiconductor field-effect transistor (n-type MOS-FET) is used as the switch.

The motor current detection circuit 3 includes resistances 3a, 3b, and 3c. The resistances 3a, 3b, and 3c are for detecting the motor current. Here, it is preferably that the resistance value of the respective resistances 3a, 3b, and 3c is loaded to be sufficiently smaller (for example, to be between 0.5 and 1Ω) than the resistance value of the resistance R of the motor coil (for example, between 20 and 30Ω) so as not to affect the estimation of the motor parameters. Further, the motor current detection circuit 3 is not limited to the configuration illustrated in FIG. 1. For example, the motor current may be detected by utilizing a Hall current transformer.

As can be seen from FIG. 1, the inverter circuit 2 and the motor current detection circuit 3 are serially connected. One end of the respective inverters 2a, 2b, and 2c is connected to a direct current voltage $V_{dc}$ (for example, 300 V) and one end of the respective resistances 3a, 3b, and 3c is connected to the ground GND.

As can be seen from FIG. 1, the PWM generator 20 of the vector control unit 1 and the control terminals of the inverters 2a, 2b, and 2c of the inverter circuit 2 are electrically connected. The inverter 2a is controlled by signals U and /U. Similarly, the inverter 2b is controlled by signals V and /V and the inverter 2c is controlled by signals W and /W. Here, the signals /U, /V, and /W are reverse signals of the respective signals U, V, and W.

As can be seen from FIG. 1, the A/D converter 30 is electrically connected to the resistances 3a, 3b, and 3c of the motor current detection circuit 3. The motor current of each phase (alternatively, may be the voltage proportional to the motor current) detected by the motor current detection circuit 3 is input to the A/D converter 30.

Next, the arithmetic unit 10 of the vector control unit 1 will be described in detail.

The arithmetic unit 10 includes coordinate converters 11 and 12, a controller 13 and a parameter estimation unit 14. The arithmetic unit 10 is preferably actualized on firmware as a function of a DSP or a microcomputer.

The coordinate converter 11 performs coordinate conversion on the motor currents $I_u$, $I_v$, and $I_w$ of the uvw-coordinate system output from the A/D converter 30 into the dq-coordinate system using expression (1) and the rotor angle θ acquired from the controller 13, and generates the d-axis motor current $I_d$ and the q-axis motor current $I_q$. The coordinate converter 11 outputs the generated d-axis motor current $I_d$ and q-axis motor current $I_q$ to the controller 13 and the parameter estimation unit 14.

The coordinate converter 12 performs coordinate conversion on the motor voltages $V_d$ and $V_q$ of the dq-coordinate system input from the controller 13 into the uvw-coordinate system using expression (3) and the rotor angle θ acquired from the controller 13, and generates the motor voltages $V_u$, $V_v$, and $V_w$. The coordinate converter 12 outputs the generated motor voltages $V_u$, $V_v$, and $V_w$ to the PWM generator 20.

The controller 13 performs the vector control over the motor 200 using the loaded motor parameters. That is, the controller 13 acquires the motor voltages $V_d$ and $V_q$ using the motor currents $I_d$ and $I_q$ received from the coordinate converter 11, the motor voltage equation (i.e., expression (2)), the motor parameters loaded by the parameter estimation unit 14, and the desired angular speed. Then, the motor voltages $V_d$ and $V_q$ are output to the coordinate converter 12. In addition, the controller 13 estimates the rotor angle θ according to the known technology without using a position sensor (for example, see Japanese Patent Application Laid-open No. 2001-339999 and Japanese Patent Application Laid-open No. 2002-281782) and outputs the estimated rotor angle θ to the coordinate converters 11 and 12.

The parameter estimation unit 14 receives the motor currents $I_d$ $I_q$ from the coordinate converter 11. The motor parameters are estimated using the motor currents $I_d$ and $I_q$ by the method described later. Further, the parameter estimation unit 14 transmits a duty ratio control signal to the PWM generator 20, so that the duty ratio of the PWM signal output from the PWM generator 20 is controlled to an arbitrary value (0≦D≦1).

The PWM generator 20 generates PWM signals having the duty ratio corresponding to the motor voltages $V_u$, $V_v$, and $V_w$, respectively, input from the coordinate converter 12. As can be seen from FIG. 1, when a high signal (i.e., a signal of "1") is output from the PWM generator 20 as the signal U, the voltage $V_{dc}$ is supplied to the u-phase of the motor 200 from the inverter 2a. On the contrary, when a low signal (i.e., a signal of "0") is output from the PWM generator 20 as the signal U, the voltage is not supplied to the u-phase of the motor 200. The above description similarly applied to the signals V and W. Accordingly, the PWM generator 20 generates the PWM signal having a higher duty ratio as the motor voltages ($V_u$, $V_v$, $V_w$) increases.

The A/D converter 30 performs A/D conversion on the analog motor currents detected by the motor current detection circuit 3 and outputs the digitalized motor currents $I_u$, $I_v$, and $I_w$ to the coordinate converter 11.

Figure 2:
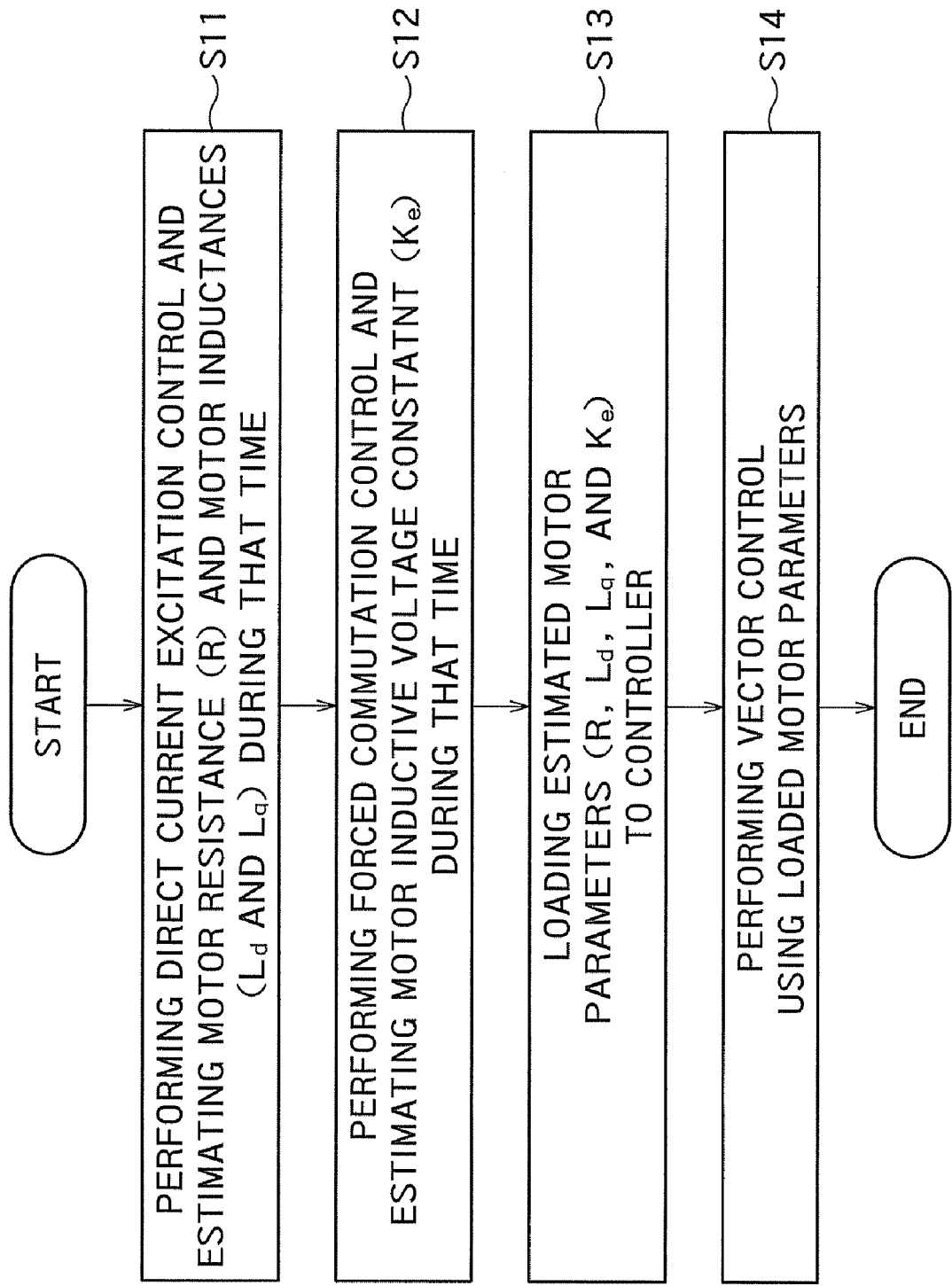
FIG. 2 is a flowchart which describes a motor drive method according to an embodiment of the present invention.

Next, operational flow of the motor drive apparatus 100 according to the present embodiment will be described with reference to a flowchart of FIG. 2.

(1) After turning on the power (i.e., after starting), the parameter estimation unit 14 performs the direct current excitation control, and during that time, estimates the motor resistance R and the motor inductances $L_d$ and $L_q$ (step S11). In the following, the estimation method of the motor parameters (R, $L_d$, and $L_q$) will be described in detail.

First, the direct current excitation control will be described. With the direct current excitation control, powering to a coil of a predetermined phase of the motor 200 and positioning of the rotor are performed.

In the direct current excitation control, the duty ratios Du, Dv, and Dw of the PWM signals of the respective u, v and w-phases output by the PWM generator 20 are fixed respectively to a predetermined value by way of controlling the PWM generator 20 by the parameter estimation unit 14. For example, it is assumed that the duty ratio of the PWM signal of the u-phase is set to be D (0<D<1) and the duty ratios of the PWM signals of the v-phase and the w-phase are set to be zero. That is, it is assumed that ($D_u$, $D_v$, $D_w$)=(D, 0, 0). More specifically, the PWM generator 20 outputs the PWM signal having the duty ratio D as the signal U, the reverse signal of the signal U as the signal /U, high signals as the signals /V and /W, and low signals as the signals V and W, respectively.

When sufficient time passes in the state of the direct current excitation control, the angular speed $\omega_m$ becomes possible to be regarded as approximately zero (i.e., $\omega_m \approx 0$). At that time, the motor voltage equation of expression (2) can be approximated to expression (4).

$$\begin{pmatrix} V_d \\ V_q \end{pmatrix} = \begin{pmatrix} RI_d + L_d \frac{d}{dt} I_d \\ RI_q + L_q \frac{d}{dt} I_q \end{pmatrix} \quad (4)$$

As can be seen from expression (4), the same relation holds for d-axis and q-axis. Here, details on the d-axis will be described.

In the state of the above direct current excitation control (i.e., in the state of ($D_u$, $D_v$, $D_w$)=(D, 0, 0)), the rotor angle θ is to be zero. At that time, the d-axis motor voltage $V_d$ is the PWM signal having the amplitude of $\sqrt{(2/3)}V_{dc}$ and the duty ratio D. Meanwhile, the q-axis motor voltage $V_q$ is zero.

Next, time waveforms of the d-axis motor voltage $V_d$ and the d-axis motor current $I_d$ in the direct current excitation control state will be described.

Figure 3:
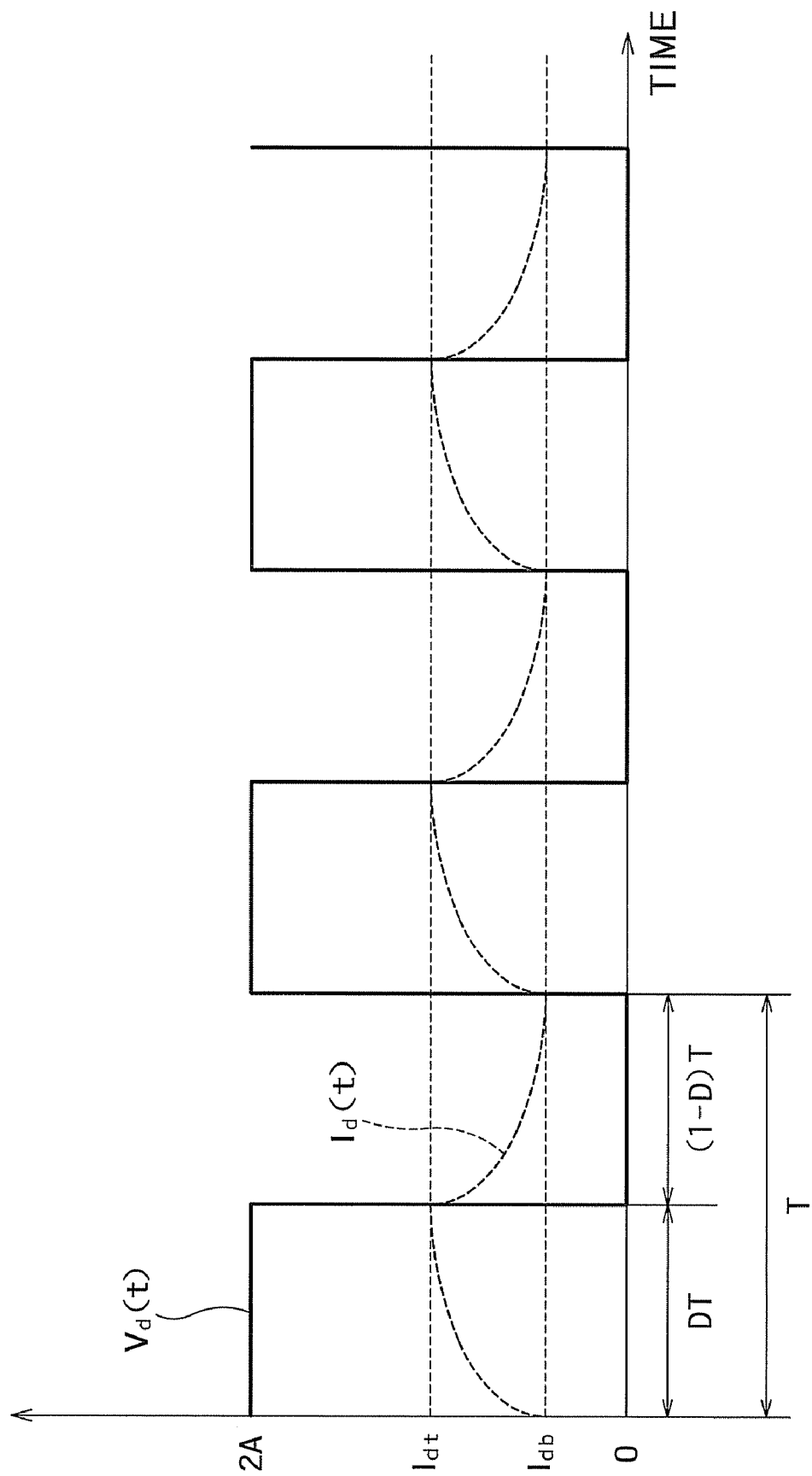
FIG. 3 is a view which illustrates time waveforms of a d-axis motor voltage $V_d$ and a d-axis motor current $I_d$.

FIG. 3 illustrates a time waveform of the d-axis motor voltage $V_d$ (the solid line) and a time waveform of the d-axis motor current $I_d$ (the broken line). The d-axis motor voltage $V_d$ forms pulses having an amplitude of 2 A (here, the high level is 2 A and the low level is zero), a cycle T, and the duty ratio D (0<D<1). As can be seen from FIG. 3, in the state that the d-axis motor voltage $V_d$ is applied, the d-axis motor current $I_d$ is to be a sawtooth waveform.

Next, peak values of the sawtooth d-axis motor current $I_d$ will be described. As can be seen from FIG. 3, the peak values of the d-axis motor current $I_d$ include a peak value $I_{dt}$ at the top side (i.e., the maximum peak value) and a peak value $I_{db}$ at the bottom side (i.e., the minimum peak value).

Focusing attention on the term when the d-axis motor voltage $V_d$ is at the low level, that is, the term between time (n+D)T and time (n+1)T (n=0, 1, 2, . . .), the d-axis motor current $I_d$ is exponentially decreased from the $I_{dt}$ to $I_{db}$ during the time of (1−D)T. Therefore, expression (5) is satisfied.

$$\frac{I_{db}}{I_{dt}} = \exp\left(-\frac{R(1-D)T}{L_d}\right) \quad (5)$$

By working out expression (5) for the d-axis motor inductance $L_d$, expression (6) can be acquired.

$$L_d = \frac{R(1-D)T}{\log(I_{dt}) - \log(I_{db})} = \frac{R(1-D)T}{2\tanh^{-1}\left(\frac{I_{dt} - I_{db}}{I_{dt} + I_{db}}\right)} \quad (6)$$

Meanwhile, focusing attention on the term when the d-axis motor voltage $V_d$ is at the high level, that is, the term between time nT and time nT+DT (n=0, 1, 2, . . .), the motor current becomes to the minimum peak value $I_{db}$ at time nT. Here, assuming that the d-axis motor voltage $V_d$ is applied for infinite time as being at the high level (i.e., at 2 A), the d-axis motor current $I_d$ is to be converged to 2A/R. That is, $I_d(\infty)$ =2A/R. This is derived from expression (4) and $dI_d/dt=0$.

Accordingly, the d-axis motor current $I_d$ in the term when the d-axis motor voltage $V_d$ is at the high level is given by expression (7).

$$I_d(t) = \left(I_{db} - \frac{2A}{R}\right)\exp\left(-\frac{Rt}{L_d}\right) + \frac{2A}{R} \quad (7)$$

When t=DT, the d-axis motor current $I_d$ is to be the maximum peak value $I_{dt}$. Therefore, expression (8) is satisfied.

$$I_{dt} = \left(I_{db} - \frac{2A}{R}\right)\exp\left(-\frac{RDT}{L_d}\right) + \frac{2A}{R} \quad (8)$$

Here, both sides of expression (5) are powered with D/(1−D) to acquire expression (9).

$$\left(\frac{I_{db}}{I_{dt}}\right)^{\frac{D}{1-D}} = \exp\left(-\frac{RDT}{L_d}\right) \quad (9)$$

Substituting expression (9) into expression (8), expression (10) is acquired.

$$\left(I_{db} - \frac{2A}{R}\right)\left(\frac{I_{db}}{I_{dt}}\right)^{\frac{D}{1-D}} + \frac{2A}{R} = I_{dt} \quad (10)$$

Coordinating expression (10), expression (11) for acquiring the motor resistance is acquired.

$$R = 2A \frac{I_{dt}^{\frac{D}{1-D}} - I_{db}^{\frac{D}{1-D}}}{I_{dt}^{\frac{1}{1-D}} - I_{db}^{\frac{1}{1-D}}} \quad (11)$$

Since it is common that the duty ratio D is set to be sufficiently small in order to prevent overcurrent (i.e., D<<1), expression (11) can be approximated to expression (12).

$$R \cong 2A \frac{I_{dt}^{D} - I_{db}^{D}}{I_{dt} - I_{db}} \quad (12)$$

Further, using the following approximation, the exponential calculation can be simplified.

$$R \cong 2A \frac{I_{dt}^{D} - I_{db}^{D}}{I_{dt} - I_{db}} \cong 2AD\left(\frac{I_{dt} + I_{db}}{2}\right)^{(D-1)} \cong 2AD\left(\frac{I_{dt} + I_{db}}{2}\right)^{-1} \quad (13)$$

Here, the relation of $(f(b)-f(a))/(b-a) \cong f'((b+a)/2)$ is utilized to derive expression (13).

Expression (13) denotes that the motor resistance value is estimated by dividing the effective value 2AD (i.e., the amplitude×the duty ratio) of the d-axis motor voltage by the mean value $(I_{dt}+I_{db})/2$ of the approximated d-axis motor current.

In addition, the d-axis motor inductance $L_d$ can be estimated by substituting the motor resistance R acquired through expression (11), expression (12) or expression (13) into expression (6).

Here, when calculating the d-axis motor inductance $L_d$ with expression (6), the values of the log function and the tan h$^{-1}$ function may be acquired by finding an approximate value using polynomials through Taylor expansion on these functions or may be acquired using a table in which arguments and functional values are related.

Further, in the case that the duty ratio is 50% (i.e., D=0.5), expression (13) and expression (6) are simplified respectively to expression (14) and expression (15).

$$R = \frac{A}{\left(\frac{I_{dt} + I_{db}}{2}\right)} \quad (14)$$

$$L_d = \frac{RT}{4\tanh^{-1}\left(\frac{R}{A}\left(\frac{I_{dt} - I_{db}}{2}\right)\right)} \quad (15)$$

Further, in the above description, the duty ratios of the respective phases are set as $(D_u, D_v, D_w)=(D, 0, 0)$. However, the present embodiment is not limited to the above. That is, in general, it is simply required that the duty ratio of at least one phase is zero and the duty ratio of at least one phase is not zero. Here, in the case that the duty ratios of two phases are not zero, the duty ratios of the two phases must be matched. That is, the combination of the duty ratios of the respective phases $(D_u, D_v, D_w)$ may be any of (0, D, 0), (0, 0, D), (D, D, 0), (D, 0, D) and (0, D, D). In these cases, the motor resistance R and the motor inductance $L_d$ can be estimated as similar to the above.

As described above, in the present embodiment, the maximum peak value and the minimum peak value of the motor current synchronized with the motor voltage of pulse signals are utilized to estimate the motor resistance R and the motor inductance $L_d$. Therefore, the maximum peak value $I_{dt}$ and the minimum peak value $I_{db}$ can be measured by sufficient times in a short time. Accordingly, with the mean value of the measured values, the motor resistance and the motor inductance can be robustly estimated.

Next, the estimation method of the q-axis motor inductance $L_q$ will be described. As can be seen from the motor voltage equation of expression (2), the state of $I_q \neq 0$ is required to estimate the q-axis motor inductance $L_q$. Hence, right after the d-axis motor inductance $L_d$ is estimated, the PWM signal is output to a phase different from the phase for the estimation of the d-axis motor inductance $L_d$. In the case of $(D_u, D_v, D_w)=(D, 0, 0)$ for estimating the d-axis motor inductance $L_d$, $(D_u, D_v, D_w)$ are to be (0, D, 0), for example, for estimating the q-axis motor inductance $L_q$. Then, similarly to the case of the d-axis motor inductance $L_d$, the estimation of the q-axis motor inductance $L_q$ is performed. Here, the estimation of the q-axis motor inductance $L_q$ is required to be performed within a short time (for example, within dozens of milliseconds) to the extent that the position change of the rotor can be negligible. This is to avoid an error in estimation of the q-axis motor inductance $L_q$ due to counter electromotive force generated based on the angular speed.

Here, in the case that the motor 200 is a non-salient polar type, the estimation of the q-axis motor inductance $L_q$ may be eliminated since it is possible to regard as $L_q \approx L_d$.

(2) Next, the parameter estimation unit 14 performs the forced commutation control, and during that time, estimates the motor inductive voltage constant $K_e$ (step S12).

The forced commutation control is performed as follows. That is, the parameter estimation unit 14 controls the PWM generator 20, so that the ratio of the mean voltages $/V_u, /V_v,$ and $/V_w$ of the u, v and w-phases satisfies the relations in expression (16). Accordingly, the rotating magnetic field of the angular speed $\omega_m$ can be acquired. By applying the rotating magnetic field to the rotor of the motor 200 for a sufficient time, the angular speed of the rotor is forced to be a predetermined value (i.e., $\omega_m$).

$$\begin{pmatrix} \overline{V_u} \\ \overline{V_v} \\ \overline{V_w} \end{pmatrix} \propto \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} \cos\omega_m t \\ \sin\omega_m t \end{pmatrix} \quad (16)$$

The motor inductive voltage constant $K_e$ is acquired from expression (17) using expression (2).

$$K_e = \frac{V_q - RI_q - L_q \frac{dI_q}{dt} - \omega_m L_d I_d}{\omega_m} \quad (17)$$

As can be seen from expression (17), the motor inductive voltage constant $K_e$ is acquired from the motor parameters R, $L_d$, $L_q$ estimated in step S11, the motor currents $I_d$ and $I_q$ output from the coordinate converter 11, the q-axis motor voltage $V_q$, and the time differential value of the q-axis motor current $I_q$.

Here, since the alternate current components of the PWM signal are not focused, the q-axis motor voltage $V_q$ can be acquired from expression (1) and the mean motor voltages $/V_u$, $/V_v$, and $/V_w$. Regarding the motor currents $I_d$ and $I_q$ as well, the mean values are respectively acquired (for example, $I_d=(I_{dt}+I_{db})/2$ and $I_q=(I_{qt}+I_{qb})/2$), and then, the mean values can be substituted into expression (17).

Here, normally, the time differential $dI_q/dt$ of the q-axis motor current $I_q$ can be acquired from the difference between the measured values of the q-axis motor current $I_q$. However, in order to reduce an error caused by noise, it is preferable to acquire the mean value after measuring the q-axis motor current $I_q$ plural times and to acquire the time differential $dI_q/dt$ of the q-axis motor current $I_q$ from the difference of the mean values.

(3) Next, the parameter estimation unit 14 loads the motor parameters estimated in step S11 and step S12 to the controller 13 (step S13).

(4) The controller 13 performs the vector control using the loaded motor parameters (step S14).

As described above, in the present embodiment, the rotor of the motor is fixed at the predetermined position by performing the direct current excitation control at the time of starting, and then, the maximum peak value and the minimum peak value of the motor current are measured in the state thereof. Then, the motor resistance R and the motor inductances $L_d$ and $L_q$ are estimated using the maximum peak value and the minimum peak value of the measured motor current. Subsequently, by performing the forced commutation control, the rotor of the motor is rotated at the predetermined angular speed $\omega_m$. The motor inductive voltage constant $K_e$ is estimated using the motor current and the motor voltage measured in this state, the estimated motor parameters and the like.

The motor drive apparatus according to the present embodiment performs the vector control using the motor parameters (R, $L_d$, $L_q$, $K_e$) which are estimated as described above.

With the above configuration, according to the present embodiment, vector control having excellent control performance can be performed without being impacted by variation of motor parameters caused by motor manufacturing variations, temperature characteristics, secular change, and the like. Here, in the present embodiment, since the motor parameters are estimated using the motor current synchronized with pulse signals (i.e., the motor voltage), a number of measured values can be acquired in a short time. Accordingly, by using the mean value of the measured values for the estimation of the motor parameters, an estimation error caused by noise can be suppressed. Consequently, the motor parameters can be robustly estimated.

In addition, as is obvious from the abovementioned estimation method, according to the present embodiment, vector control can be performed by estimating motor parameters even when the motor parameters are completely unknown.

Further, in the present embodiment, the motor parameters are estimated using the motor current which is synchronized with the motor voltage of pulse signals not of a sine-wave. Since the D/A converter becomes unnecessary with this configuration, the motor drive apparatus according to the present embodiment can be actualized on a common microcomputer.

In the following, modified examples 1 to 7 of the present embodiment will be described.

FIRST MODIFIED EXAMPLE

In the first modified example, in the state of the direct current excitation control of step S11, the A/D converter 30 controls the timing to read the motor current value input from the motor current detection circuit 3. That is, as can be seen from FIG. 3, the A/D converter 30 acquires the maximum peak value $I_{dt}$ of the d-axis motor current by reading the motor current value at the timing of a falling edge of the d-axis motor voltage $V_d$. Similarly, the A/D converter 30 acquires the maximum peak value $I_{qt}$ of the q-axis motor current by reading the motor current value at the timing of a falling edge of the q-axis motor voltage $V_q$.

Regarding the minimum peak values as well, by reading the motor current value at the timing of rising edges of the d-axis motor voltage $V_d$ and q-axis motor voltage $V_q$, the minimum peak value $I_{db}$ of the d-axis motor current and the minimum peak value $I_{qb}$ of the q-axis motor current are acquired, respectively.

As described above, in the present modified example, the A/D converter 30 acquires the maximum peak value and the minimum peak value by reading the motor current value at the timing of the falling edge and the rising edge of the motor voltage, respectively. Accordingly, special hardware for detecting peak values of the motor current can be unnecessary.

SECOND MODIFIED EXAMPLE

Figure 4:
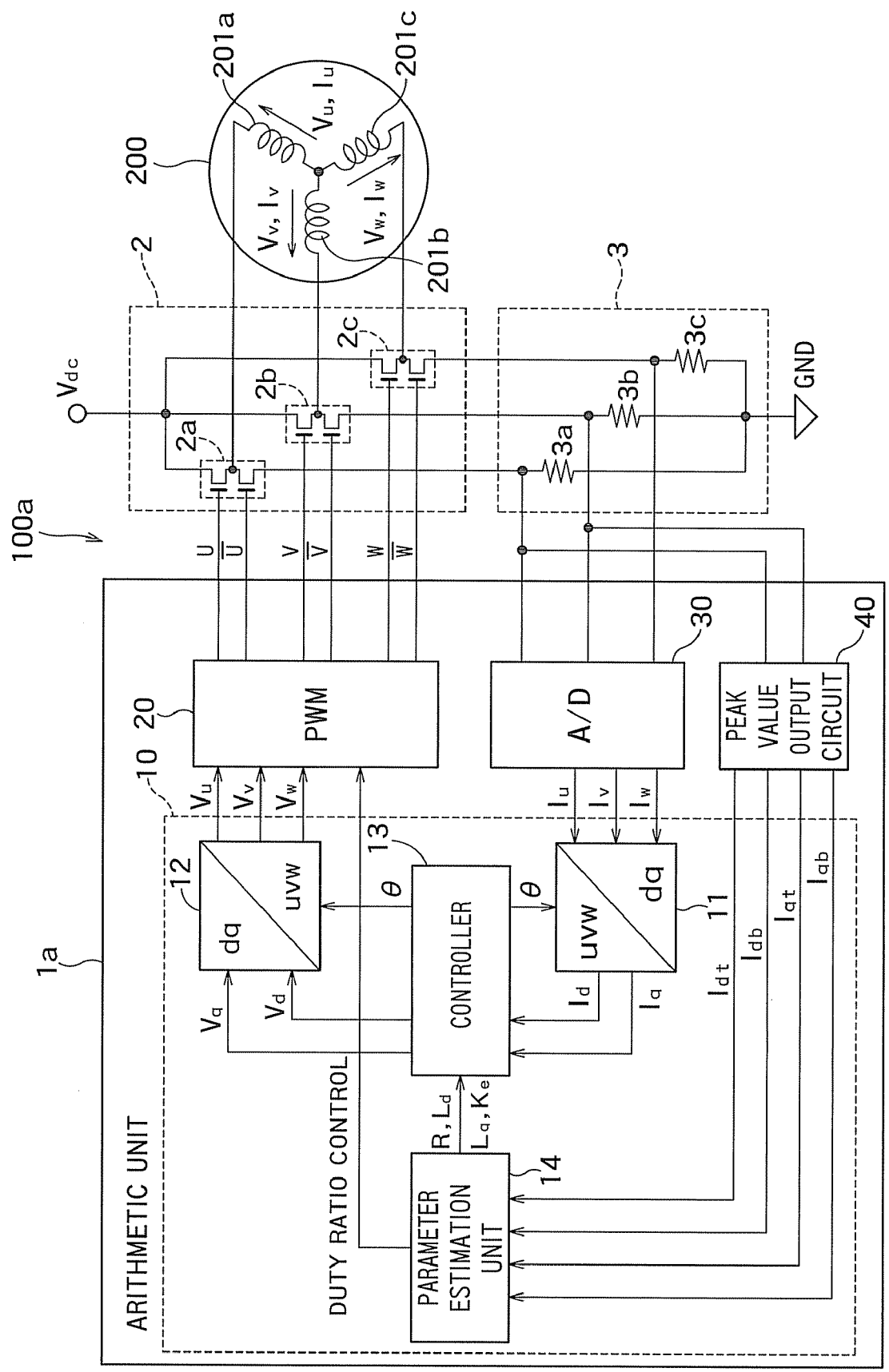
FIG. 4 is a view which illustrates configuration of a motor drive apparatus according to the second modified example of the present invention.

The configuration of a motor drive apparatus 100*a* according to the second modified example is illustrated in FIG. 4. In addition to the configuration of the vector control unit 1, a vector control unit 1*a* further includes a peak value output circuit 40, as can be seen from FIG. 4.

FIG. 5 illustrates the configuration of the peak value output circuit 40. As can be seen from FIG. 5, the peak value output circuit 40 includes a coordinate conversion circuit 41, a top peak hold circuit 42*a*, a bottom peak hold circuit 42*b* and an A/D converter 43. The coordinate conversion circuit 41 is a circuit to perform coordinate conversion from the uvw-coordinate system to the dq-coordinate system at the rotor angle of 0°. That is, the analog motor currents $I_u$ and $I_v$ are converted into the analog motor currents $I_d$ and $L_q$.

Here, the rotor angle can be set to 0° by setting the duty ratios of the direct current excitation ($D_u$, $D_v$, $D_w$) to (D, 0, 0).

Further, the coordinate conversion circuit 41 is constituted based on expression (18) acquired from expression (1) of the coordinate conversion and the relation of $I_w=-I_u-I_v$.

$$\begin{pmatrix} I_d \\ I_q \end{pmatrix} = \sqrt{\frac{2}{3}} \begin{pmatrix} \cos 0 & \sin 0 \\ -\sin 0 & \cos 0 \end{pmatrix} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} I_u \\ I_v \\ I_w \end{pmatrix} \quad (18)$$

$$= \begin{pmatrix} \sqrt{\frac{2}{3}} I_u - \frac{1}{\sqrt{6}}(I_v + I_w) \\ \frac{\sqrt{2}}{2}(I_v - I_w) \end{pmatrix}$$

-continued $$= \begin{pmatrix} \sqrt{\frac{3}{2}} I_u \\ \frac{\sqrt{2}}{2}(2I_v + I_u) \end{pmatrix}$$

The top peak hold circuit 42a holds the maximum peak value of the analog motor current output from the coordinate conversion circuit 41. Meanwhile, the bottom peak hold circuit 42b holds the minimum peak value of the analog motor current output from the coordinate conversion circuit 41. The held peak values of the motor current are output to the A/D converter 43. The A/D converter 43 performs A/D conversion on the input analog motor current value and outputs the digitalized motor current value to the parameter estimation unit 14.

As described above, in the present modified example, the rotor angle is set to be 0°, and subsequently, the peak values of the motor currents $I_d$ and $I_q$ output from the coordinate conversion circuit 41 are acquired by the peak hold circuits. With this configuration, measurement error caused by acquiring timing shift of the motor current can be avoided. Accordingly, the motor parameters can be estimated with a high degree of accuracy. Consequently, vector control having more excellent control performance can be achieved.

Figure 6:
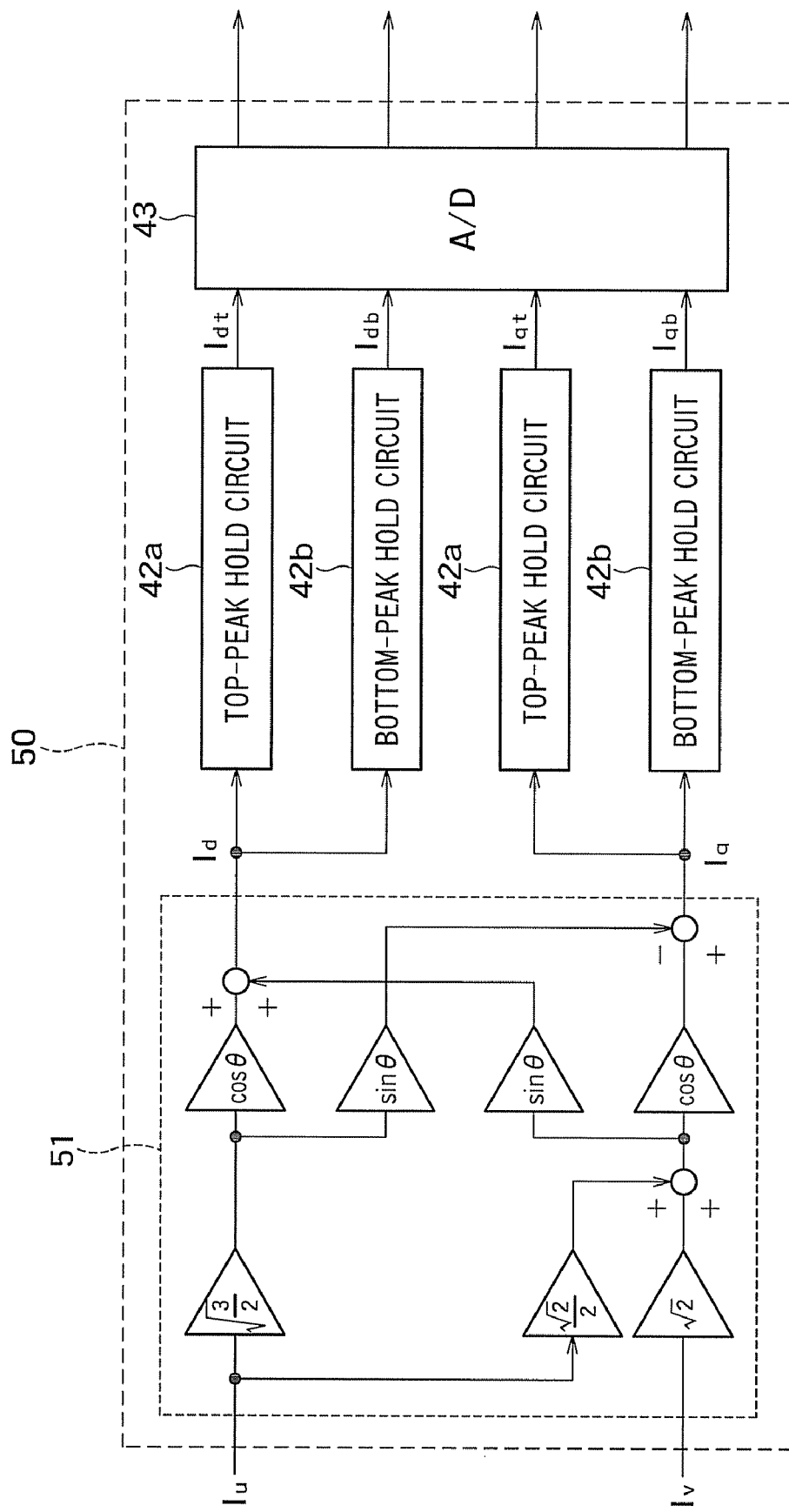
FIG. 6 is a view which illustrates configuration of a peak value output circuit in the case of the rotor angle θ.

Here, more generally, in the case that a peak value of the motor current at the rotor angle 74 is sought, a peak value output circuit 50 illustrated in FIG. 6 may be simply adopted instead of the peak value output circuit 40. The peak value output circuit 50 includes a coordinate conversion circuit 51, the top peak hold circuit 42a, the bottom peak hold circuit 42b and the A/D converter 43. The coordinate conversion circuit 51 is a circuit to perform coordinate conversion from the uvw-coordinate system to the dq-coordinate system at the rotor angle θ. That is, the analog motor currents $I_u$ and $I_v$ are converted into the analog motor currents $I_d$ and $I_q$ using the rotor angle θ received from the controller 13 or the rotor angle θ corresponding to the duty ratio at the time of direct current excitation control.

Here, the peak value output circuits 40 and 50 may also be arranged at the outside of the vector control unit 1a.

THIRD MODIFIED EXAMPLE

Figure 7:
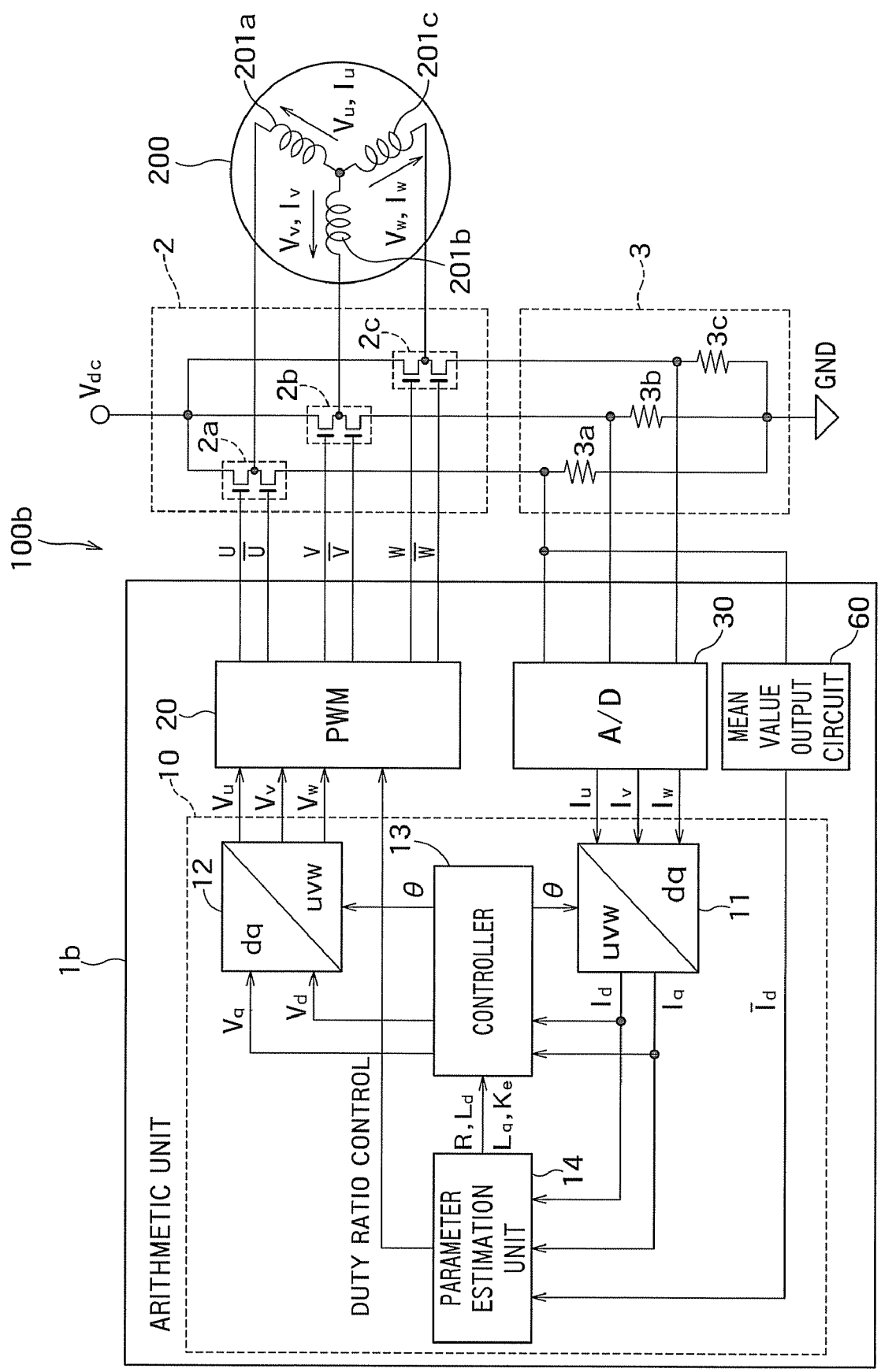
FIG. 7 is a view which illustrates configuration of a motor drive apparatus according to the third modified example of the present invention.

The configuration of a motor drive apparatus 100b according to the third modified example is illustrated in FIG. 7. In addition to the configuration of the vector control unit 1, a vector control unit 1b further includes a mean value output circuit 60, as can be seen from FIG. 7.

Figure 8:
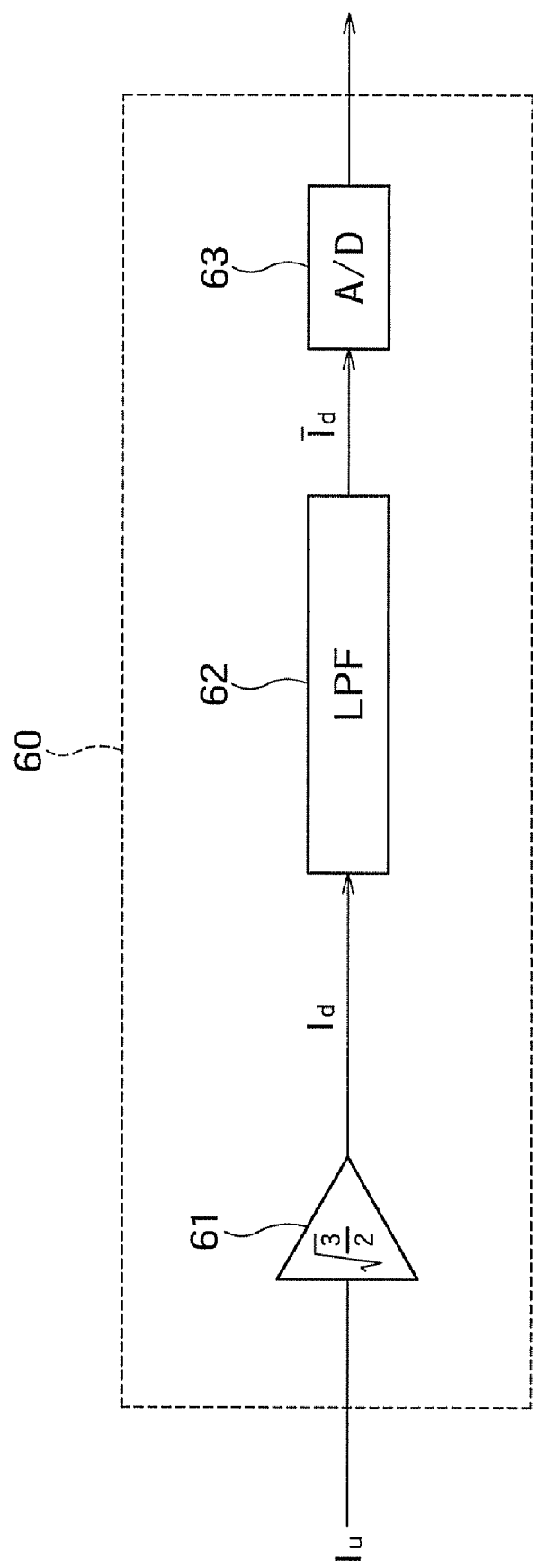
FIG. 8 is a view which illustrates configuration of a mean value output circuit in the case of the rotor angle 0°.

FIG. 8 illustrates the configuration of the mean value output circuit 60. As can be seen from FIG. 8, the mean value output circuit 60 includes a coordinate conversion circuit 61, a low-pass filter 62 and an A/D converter 63.

The coordinate conversion circuit 61 is an amplifier to multiply an input signal by $\sqrt{(3/2)}$-times. As can be seen from expression (18), the coordinate conversion circuit 61 is a circuit to perform coordinate conversion from the uvw-coordinate system to the dq-coordinate system at the rotor angle of 0°, so that the analog motor current $I_u$ is converted into the analog d-axis motor current $I_d$.

Here, the rotor angle can be set to 0° by setting the duty ratios of the direct current excitation $(D_u, D_v, D_w)$ to $(D, 0, 0)$.

The low-pass filter 62 outputs the time-averaged d-axis mean current $/I_d$ of the d-axis motor current $I_d$.

The A/D converter 63 performs A/D conversion on the d-axis mean current $/I_d$ and outputs to the parameter estimation unit 14.

The parameter estimation unit 14 estimates the motor resistance using the d-axis mean current $/I_d$. The expression used for the estimation is derived as follows.

Calculating from FIG. 3 and expression (7), the time integral value of the current waveform $I_d(t)$ is acquired by expression (19).

$$\int_0^T I_d(t)dt = \int_0^{DT}\left[\left(I_{db} - \frac{2A}{R}\right)\exp\left(-\frac{Rt}{L}\right) + \frac{2A}{R}\right]dt + \qquad (19)$$

$$\int_0^{(1-D)T}\left[I_{dt}\exp\left(-\frac{Rt}{L}\right)\right]dt$$

$$= \left[\left(I_{db} - \frac{2A}{R}\right)\left(-\frac{L}{R}\right)\exp\left(-\frac{Rt}{L}\right) + \frac{2A}{R}t\right]_0^{DT} +$$

$$\left[I_{dt}\left(-\frac{L}{R}\right)\exp\left(-\frac{Rt}{L}\right)\right]_0^{(1-D)T}$$

$$= \frac{2ADT}{R} + \left(-\frac{L}{R}\right)\left[\begin{array}{l}\left(I_{db} - \frac{2A}{R}\right)\left(\exp\left(-\frac{RDT}{L}\right) - 1\right) + \\ I_{dt}\left\{1 - \exp\left(-\frac{R(1-D)T}{L}\right)\right\}\end{array}\right]$$

Expression (19) can be further arranged to make expression (20) using expression (5) and expression (8).

$$\int_0^T I_d(t)dt = \frac{2ADT}{R} + \qquad (20)$$

$$\left(-\frac{L}{R}\right)\left[\left(I_{dt} - \frac{2A}{R}\right) - \left(I_{db} - \frac{2A}{R}\right) + I_{dt}\left(1 - \frac{I_{db}}{I_{dt}}\right)\right]$$

$$= \frac{2ADT}{R}$$

Accordingly, the d-axis mean current $/I_d$ is given by expression (21).

$$\bar{I}_d = \frac{1}{T}\int_0^T I_d(t)dt = \frac{2AD}{R} \qquad (21)$$

Expression (22) can be acquired by modifying expression (21).

$$R = \frac{2AD}{\bar{I}_d} \qquad (22)$$

The motor resistance R can be acquired from expression (22).

Expressions (19) to (22) similarly hold for the q-axis motor current.

As described above, in the present modified example, the rotor angle is set to be 0°, and subsequently, the motor resistance is estimated using the motor current mean value acquired by the mean value output circuit 60. Since the measurement error caused by acquiring timing shift of the motor current can be avoided with this configuration, the motor parameters can be estimated with a high degree of accuracy. Consequently, vector control having more excellent control performance can be achieved.

Further, as is obvious by comparing the expression (i.e., expression (22)) for the estimation of the motor resistance in the present modified example with the expressions (i.e., expressions (11) to (13)) for the abovementioned estimation of the motor resistance, the present modified example makes a calculation for the estimation of the motor resistance easier.

Here, the mean value output circuit 60 may be arranged at the outside of the vector control unit 1b.

Figure 9:
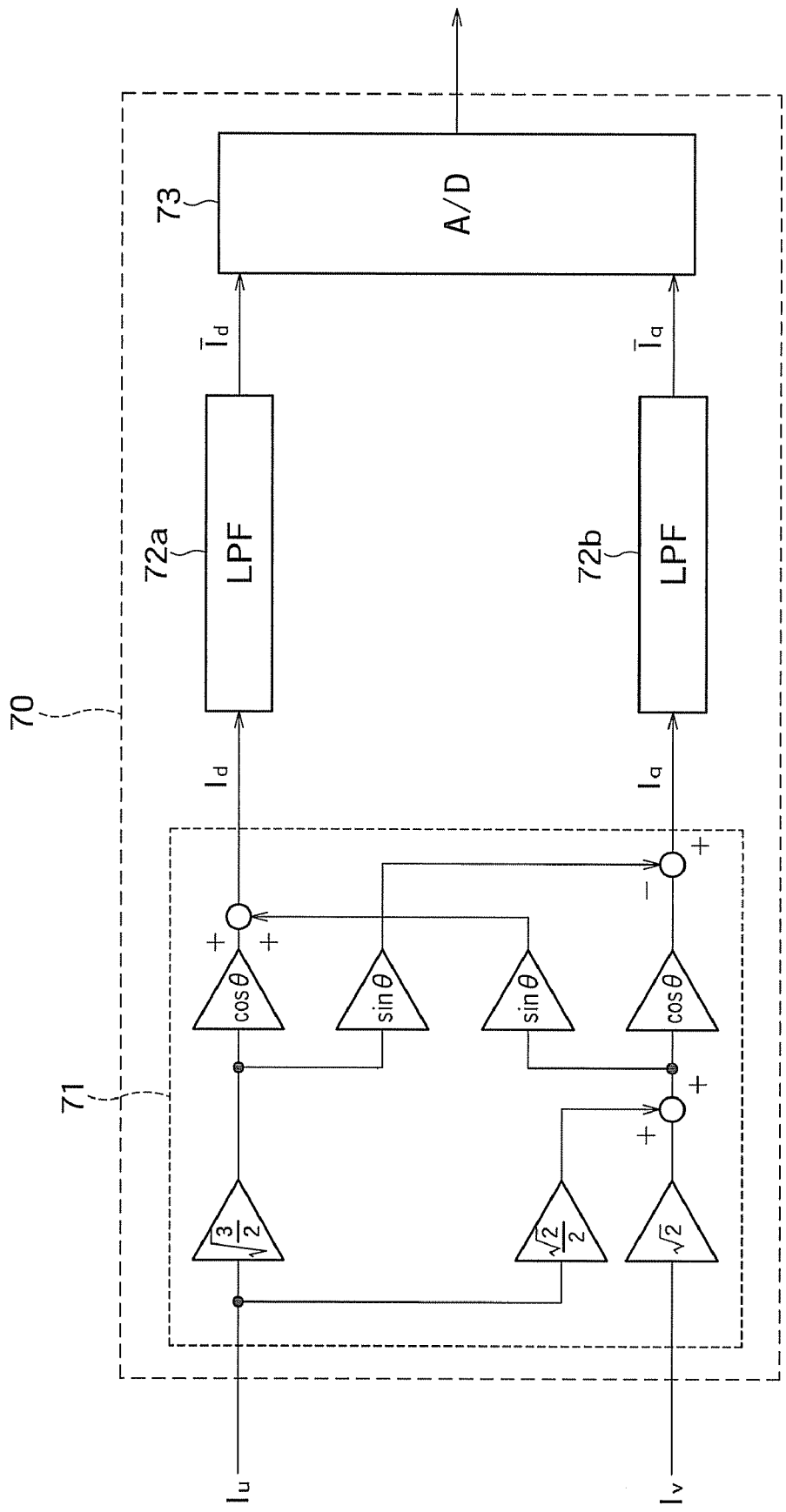
FIG. 9 is a view which illustrates configuration of a mean value output circuit in the case of the rotor angle θ.

Here, more generally, in the case that a mean value of the motor current at the rotor angle θ is sought, a mean value output circuit 70 illustrated in FIG. 9 may be simply adopted instead of the mean value output circuit 60. As can be seen from FIG. 9, the mean value output circuit 70 includes a coordinate conversion circuit 71, low-pass filters 72a and 72b and an A/D converter 73.

As can be seen from expression (1), the coordinate conversion circuit 71 is a circuit to perform coordinate conversion from the uvw-coordinate system to the dq-coordinate system at the rotor angle θ. That is, the analog motor currents $I_u$ and $I_v$ are converted into the analog motor currents $I_d$ and $I_q$ using the rotor angle θ received from the controller 13 or the rotor angle θ corresponding to the duty ratio at the time of direct current excitation control. The low-pass filters 72a and 72b respectively output the d-axis mean current $/I_d$ and the q-axis mean current $/I_q$. The d-axis mean current $/I_d$ and the q-axis mean current $/I_q$ are converted into digital values by the A/D converter 73, and subsequently, at least one of the digitalized mean currents is output to the parameter estimation unit 14.

Here, the mean value output circuit 70 illustrated in FIG. 9 is not the minimum configuration. That is, the low-pass filter 72b may be eliminated in the case that the motor resistance is acquired from the d-axis mean current $/I_d$. On the contrary, the low-pass filter 72a may be eliminated in the case that the motor resistance is acquired from the q-axis mean current $/I_q$. In these cases, the coordinate conversion circuit 71 may be configured to output either the d-axis motor current or the q-axis motor current.

FOURTH MODIFIED EMBODIMENT

Figure 10:
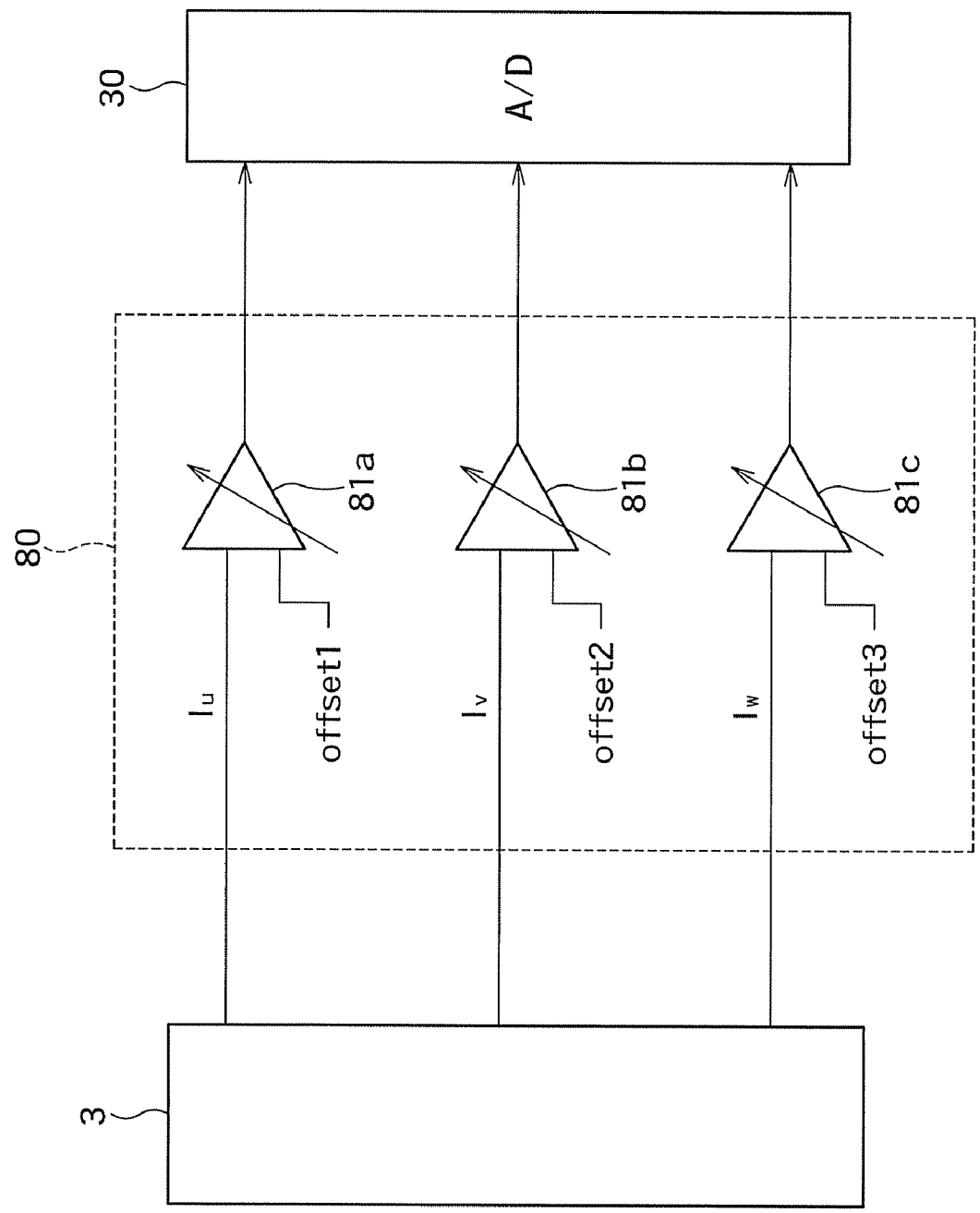
FIG. 10 is a view which illustrates configuration of an amplification circuit according to the fourth modified example of the present invention.

In the fourth modified embodiment, an amplification circuit 80 is arranged between the motor current detection circuit 3 and the A/D converter 30, as illustrated in FIG. 10. The amplification circuit 80 includes amplifiers 81a, 81b, and 81c. The motor currents of the u-phase, the v-phase and the w-phase detected by the motor current detection circuit 3 are respectively input to the amplifiers 81a, 81b, and 81c. Each of the amplifiers 81a, 81b, and 81c amplifies the difference between the input current and a predetermined offset by a predetermined gain and outputs to the A/D converter 30. The offset and the gain of each of the amplifiers 81a, 81b, and 81c can be arbitrarily changed.

By respectively adjusting the offset and the gain for each of the amplifiers 81a, 81b, and 81c, the pulsation amplitude of the motor currents $I_u$, $I_v$, and $I_w$ can be enlarged.

Figure 11:
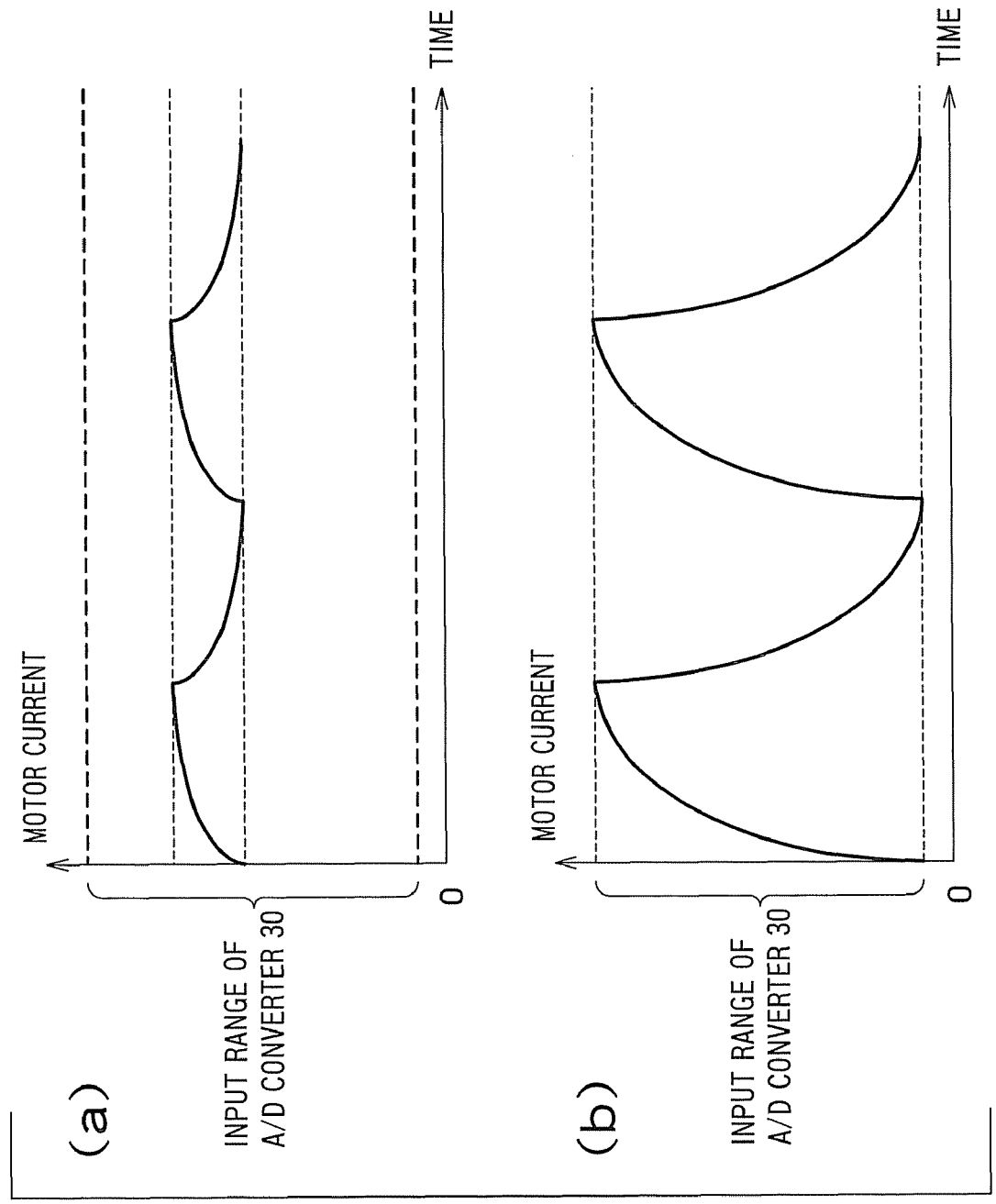

FIG. 11 illustrates time waveforms of the motor current input to the A/D converter 30 and an input range of the A/D converter 30. FIG. 11(a) illustrates the time waveform of the motor current in the case without the amplification circuit 80 and FIG. 11(b) illustrates the time waveform of the motor current in the case with the amplification circuit 80. As can be seen from FIGS. 11(a) and 11(b), the amplification circuit 80 amplifies the pulsation amplitude of the motor current within the range not to exceed the input range of the A/D converter 30. In this manner, the input range of the A/D converter 30 can be sufficiently used. Accordingly, the A/D converter 30 can acquire the maximum peak and the minimum peak of the motor current with excellent S/N ratio (Signal to Noise ratio) even when the resolution of the A/D converter 30 is rough.

As described above, in the present modified example, the pulsation amplitude of the motor current is enlarged by using the amplifier having the adjustable gain and offset. Accordingly, the A/D converter 30 can acquire the maximum peak and the minimum peak of the motor current with excellent S/N ratio. In this manner, the motor parameters can be estimated with a high degree of accuracy. Consequently, the vector control having more excellent control performance can be achieved.

FIFTH MODIFIED EXAMPLE

Figure 12:
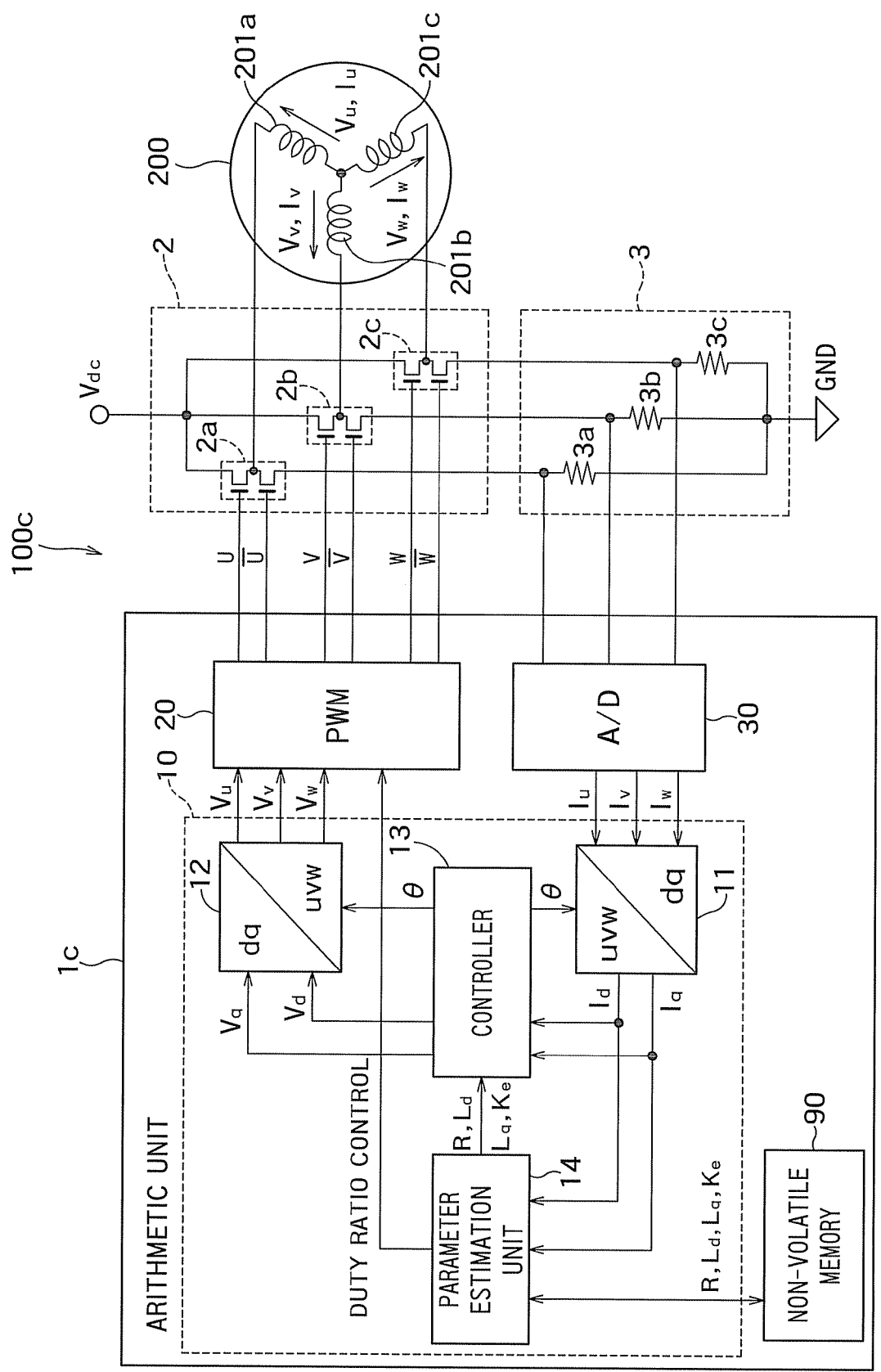
FIG. 12 is a view which illustrates configuration of a motor drive apparatus according to the fifth modified example of the present invention.

The configuration of a motor drive apparatus 100c according to the fifth modified example is illustrated in FIG. 12. In addition to the configuration of the vector control unit 1, a vector control unit 1c further includes a non-volatile memory 90, as can be seen from FIG. 12. In the present modified example, the estimated motor parameters are stored at the non-volatile memory 90. Then, when the motor parameters are stored in the non-volatile memory 90 at the time of turning on the power (i.e., at the time of starting), the estimation sequence is eliminated and the vector control is performed using the stored values. On the contrary, when the motor parameters are not stored, the motor parameters are estimated anew.

Figure 13:
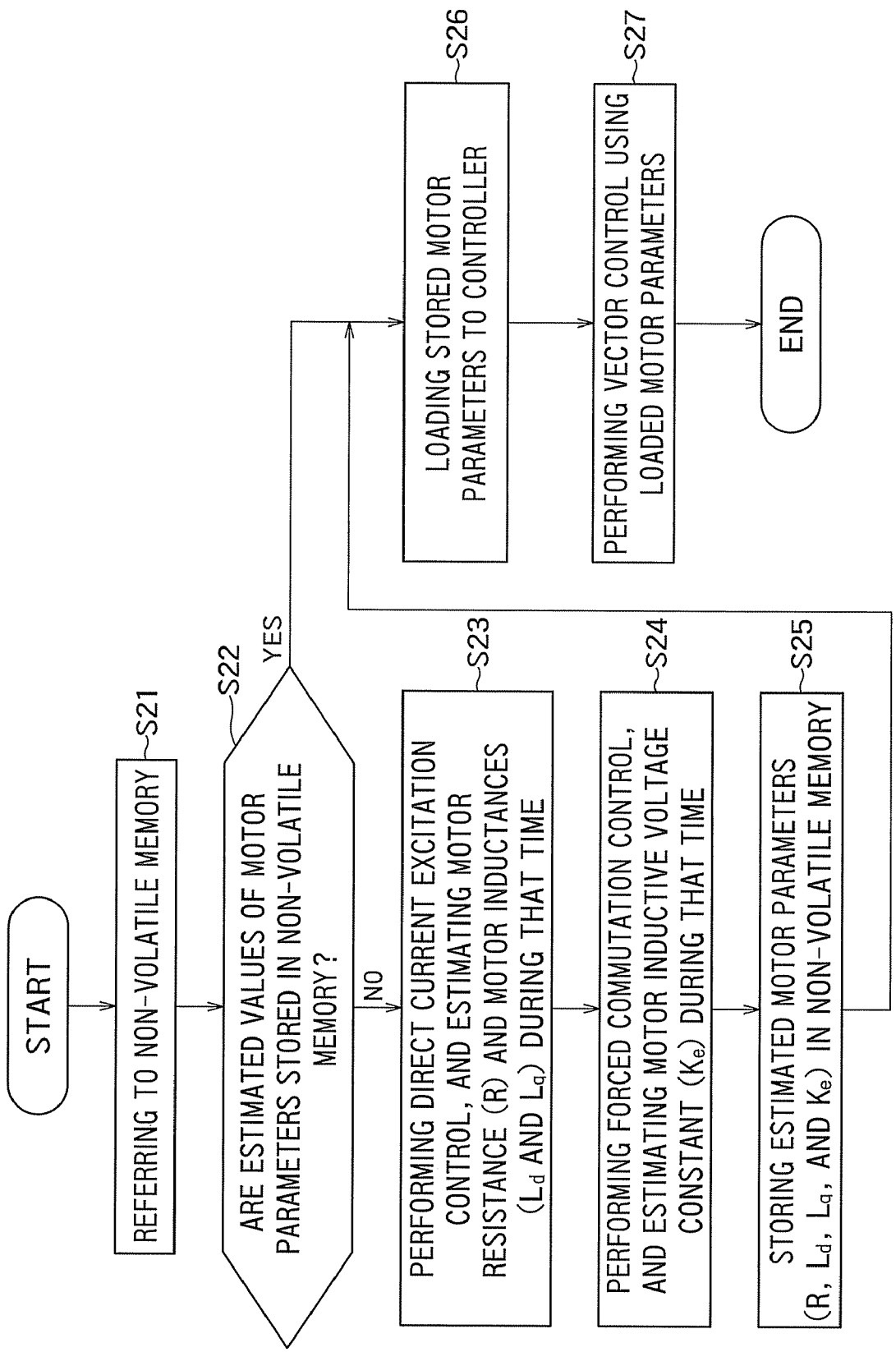
FIG. 13 is a flowchart which describes a motor drive method according to the fifth modified example of the present invention.

The operational flow of the motor drive apparatus 100c according to the present modified example is described in FIG. 13. In the following, the operational flow will be described along FIG. 13.

(1) After turning on the power (i.e., after starting), the parameter estimation unit 14 refers to the non-volatile memory 90 (step S21).

(2) The parameter estimation unit 14 determines whether or not the estimated values of the motor parameters are stored in the non-volatile memory 90 (step S22). When the estimated values of the motor parameters are stored, it proceeds to step S26. Otherwise, it proceeds to step S23.

(3) In the case that the estimated values of the motor parameters are not stored at the non-volatile memory 90, the parameter estimation unit 14 performs the direct current excitation control, and during that time, estimates the motor resistance R and the motor inductances $L_d$ and $L_q$ (step S23). As being similar to the abovementioned step S11, detailed description of this step will not be repeated.

(4) The parameter estimation unit 14 performs the forced commutation control, and during that time, estimates the motor inductive voltage constant $K_e$ (step S24). As being similar to the abovementioned step S12, detailed description of this step will not be repeated.

(5) The parameter estimation unit 14 stores the motor parameters estimated in step S23 and step S24 in the non-volatile memory 90 (step S25).

(6) The parameter estimation unit 14 loads the motor parameters stored in the non-volatile memory 90 to the controller 13 (step S26).

(7) The controller 13 performs the vector control using the loaded motor parameters (step S27).

As described above, in the present modified example, the estimated values of the motor parameters are stored in the non-volatile memory and the vector control is performed using the values at the time of the next starting. In this manner the estimation sequence (i.e., steps S23 to S25) can be eliminated at the second time of starting or after. Consequently, the activation time from turning on the power until performing the vector control can be shortened.

Here, in the above description, the non-volatile memory 90 is arranged at the inside of the vector control unit 1c. However, not limited to this, it is also possible to arrange the memory at the outside of the vector control unit 1c.

SIXTH MODIFIED EXAMPLE

Figure 14:
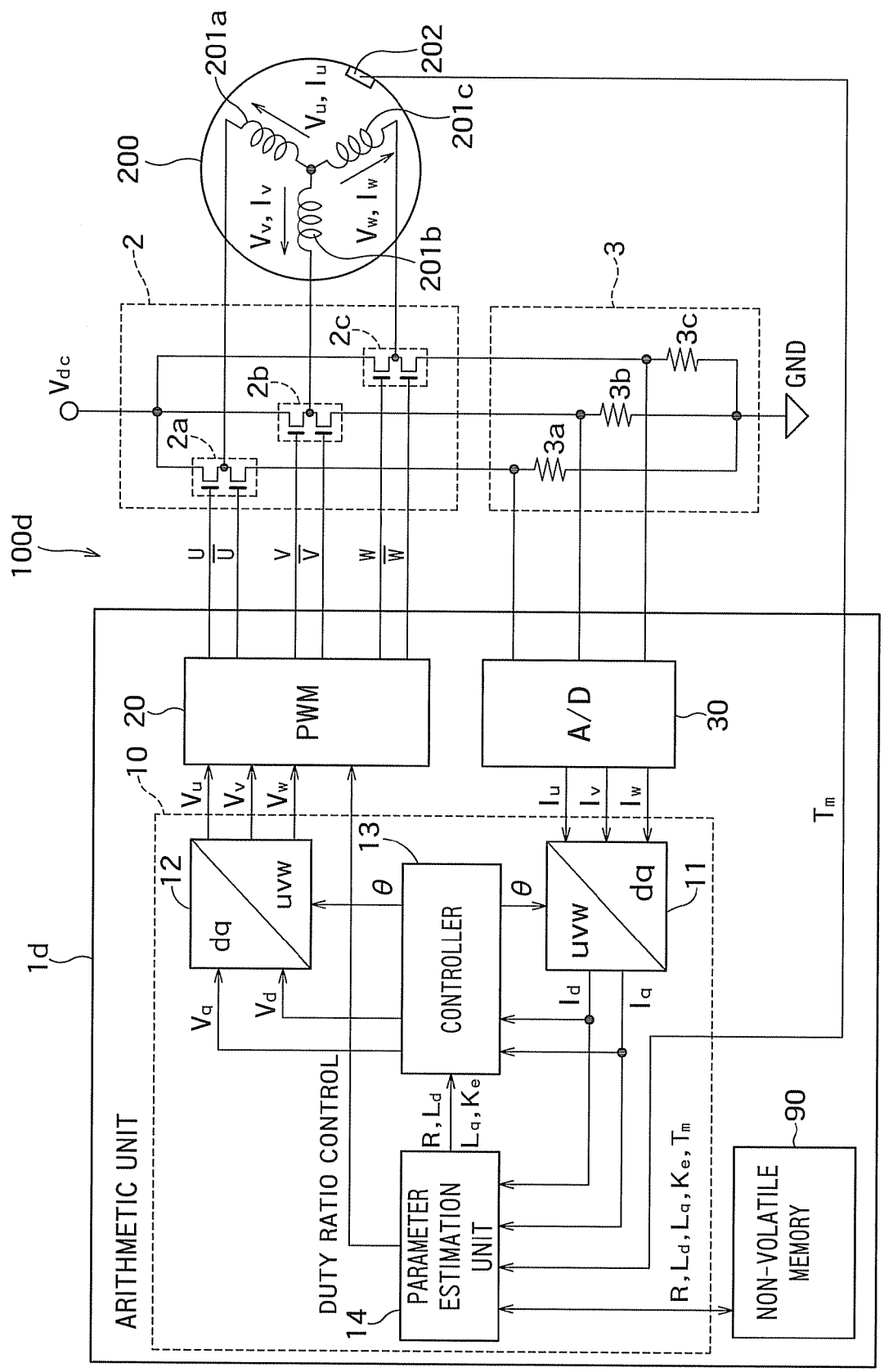
FIG. 14 is a view which illustrates configuration of a motor drive apparatus according to the sixth modified example of the present invention.

The configuration of a motor drive apparatus 100d and a motor 200d according to the sixth modified example is illustrated in FIG. 14. In addition to the configuration of the vector control unit 1, a vector control unit id further includes the non-volatile memory 90, as can be seen from FIG. 14. Further, the motor 200d includes a temperature sensor 202 to measure temperature of the motor. In the present modified example, the estimated motor parameters are stored in the non-volatile memory 90 being associated with the temperature measured by the temperature sensor 202. Then, when the motor parameters corresponding to the measured motor temperature are stored in the non-volatile memory 90, the estimation sequence is eliminated and the vector control is performed using the stored values. On the contrary, when the motor parameters corresponding to the motor temperature are not stored, the motor parameters are estimated anew.

Figure 15:
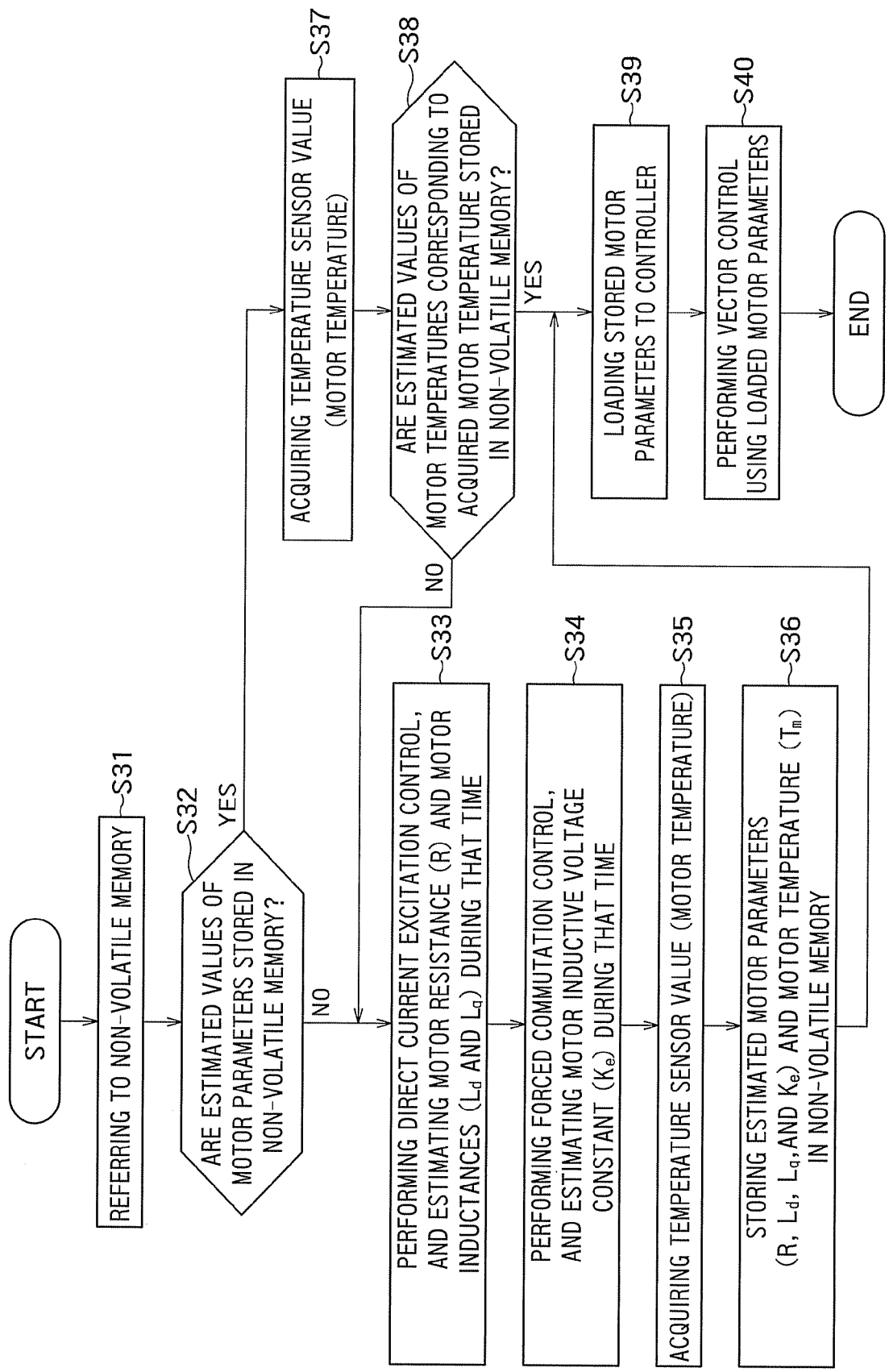
FIG. 15 is a flowchart which describes a motor drive method according to the sixth modified example of the present invention.

The operational flow of the motor drive apparatus 100d according to the present modified example is described in FIG. 15. In the following, the operational flow will be described along FIG. 15.

(1) After turning on the power (i.e., after starting), the parameter estimation unit 14 refers to the non-volatile memory 90 (step S31).

(2) The parameter estimation unit 14 determines whether or not the estimated values of the motor parameters are stored in the non-volatile memory 90 (step S32). When the estimated values of the motor parameters are stored, it proceeds to step S37. Otherwise, it proceeds to step S33.

(3) In the case that the estimated values of the motor parameters are not stored in the non-volatile memory 90, the parameter estimation unit 14 performs the direct current excitation control, and during that time, estimates the motor resistance R and the motor inductances $L_d$ and $L_q$ (step S33). As being similar to the abovementioned step S11, detailed description of this step will not be repeated.

(4) The parameter estimation unit 14 performs the forced commutation control, and during that time, estimates the motor inductive voltage constant $K_e$ (step S34). As being similar to the abovementioned step S12, detailed description of this step will not be repeated.

(5) The parameter estimation unit 14 acquires motor temperature $T_m$ of the motor 200d measured by the temperature sensor 202 (step S35).

(6) The parameter estimation unit 14 stores the motor temperature $T_m$ acquired in step S35 being associated with the motor parameters in the non-volatile memory 90 while storing the motor parameters estimated in step S33 and step S34 in the non-volatile memory 90 (step S36).

(7) When the estimated values of the motor parameters are stored in the non-volatile memory 90, the parameter estimation unit 14 acquires the motor temperature $T_m$ of the motor 200d measured by the temperature sensor 202 (step S37).

(8) The parameter estimation unit 14 determines whether or not the estimated values of the motor parameters corresponding to the motor temperature $T_m$ acquired in step S37 are stored in the non-volatile memory 90 (step S38). When the estimated values of the motor parameters are stored, it proceeds to step S39. Otherwise, it proceeds to step S33.

(9) The parameter estimation unit 14 loads the motor parameters stored in the non-volatile memory 90 to the controller 13 (step S39).

(10) The controller 13 performs the vector control using the loaded motor parameters (step S40).

According to the present modified example, in the case that the motor parameters at the same temperature have been estimated before, it becomes possible to eliminate the estimation of the motor parameters at the time of starting thereafter. Accordingly, the activation time from turning on the power until performing the vector control can be shortened.

Further, using the motor parameters corresponding to the motor temperature, the motor parameter values to be used for the vector control can be closer to the actual motor parameter values. Consequently, a motor drive apparatus having more excellent control performance can be obtained.

Here, provided that the motor parameters corresponding to two motor temperatures $T_{m1}$ and $T_{m2}$ and the motor temperature $T_m$ between the two ($T_{m1}<T_m<T_{m2}$) measured in step S37 are stored, the motor parameters at the motor temperature $T_m$ may be acquired by interpolation using the stored motor parameters even in the case that the motor parameters corresponding to the measured motor temperature are not stored at the non-volatile memory.

Further, provided that the parameter estimation unit 14 acquires a value of the temperature sensor in the abovementioned step S31, step S35 and step S37 may be eliminated.

SEVENTH MODIFIED EXAMPLE

Figure 16:
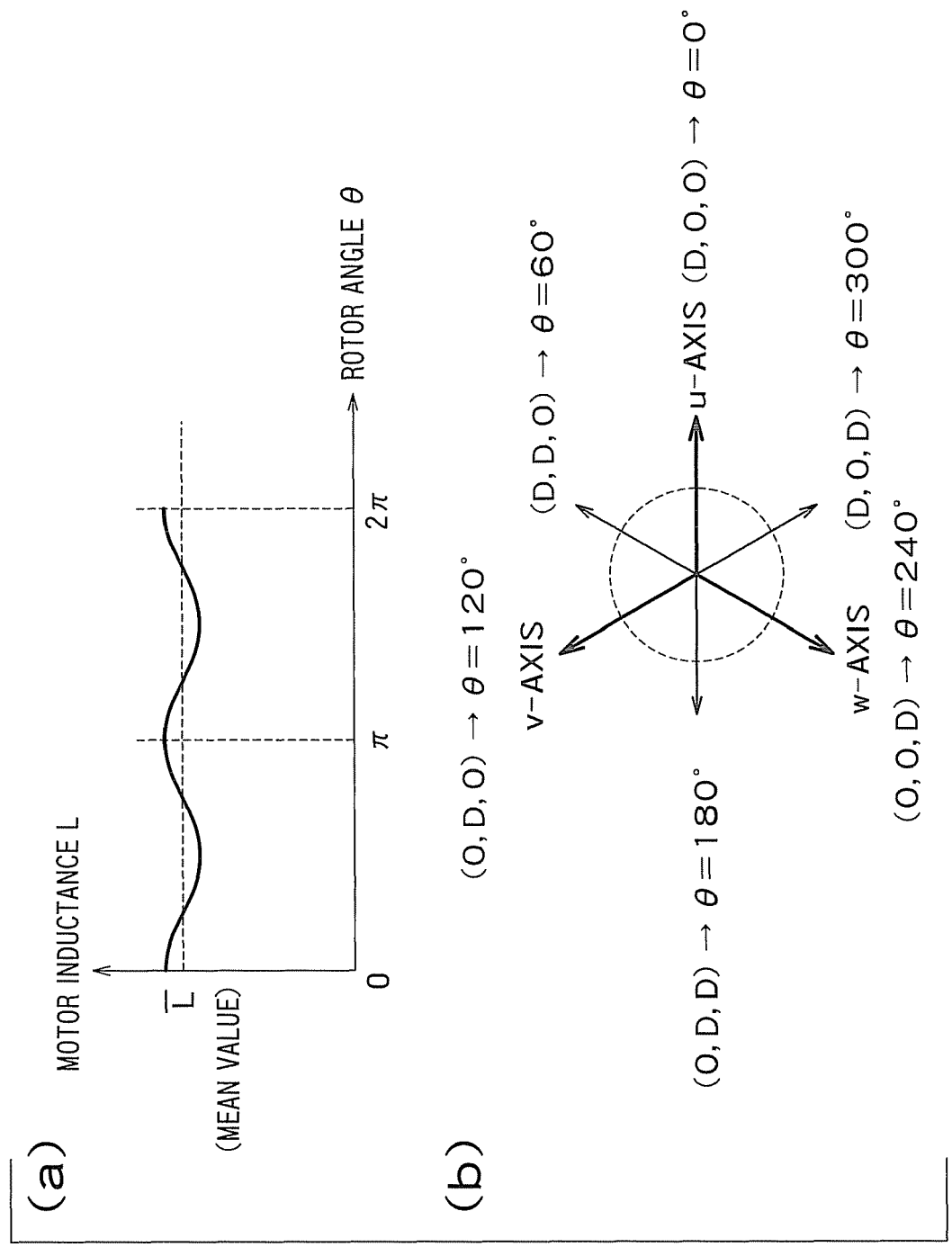

In the seventh modified example, the vector control is performed taking dependency of the motor inductance to the rotor angle θ into consideration. FIG. 16(a) illustrates an example of the rotor angle dependency of the motor inductance. In the case that a motor parameter has the rotor angle dependency as such, the present modified example is advantageous. That is, in the present modified example, the motor resistance and the motor inductance are previously acquired by performing the direct current excitation control at a plurality of rotor angles. Then, when the controller 13 performs the vector control, the vector control is performed while updating the motor resistance and the motor inductance in real time corresponding to the position-estimated rotor angle. With this configuration, the control performance such as uniformity of the angular speed $\omega_m$ can be improved.

Here, the relation between the rotor angle θ and the combination of the duty ratios $D_u$, $D_v$, and $D_w$ of three PWM signals in the direct current excitation control will be described in the case of three-phase PM motor, for example. FIG. 16(b) illustrates the relation between the combination of the duty ratios $D_u$, $D_v$, and $D_w$ of the PWM signals and the rotor angle θ. As can be seen from FIG. 16(b), when the PWM signal is applied only to the u-phase, namely, in the case of ($D_u$, $D_v$, $D_w$)=(D, 0, 0), the rotor angle is to be 0°. Similarly, the rotor angle is to be 120° when the PWM signal is applied only to the v-phase and the rotor angle is to be 240° when the PWM signal is applied only to the w-phase. Further, when the same PWM signals are applied to the u-phase and the v-phase, namely, in the case of ($D_u$, $D_v$, $D_w$)=(D, D, 0), the rotor angle is to be 60°. Similarly, the rotor angle is to be 180° when the same PWM signals are applied to the v-phase and the w-phase and the rotor angle is to be 300° when the same PWM signals are applied to the w-phase and the u-phase.

By changing the combination of the duty ratios $D_u$, $D_v$, and $D_w$ as described above, the rotor is fixed to a predetermined position (i.e., rotor angle). Subsequently, with the abovementioned method, the motor inductance at the predetermined rotor angle can be acquired.

Figure 17:
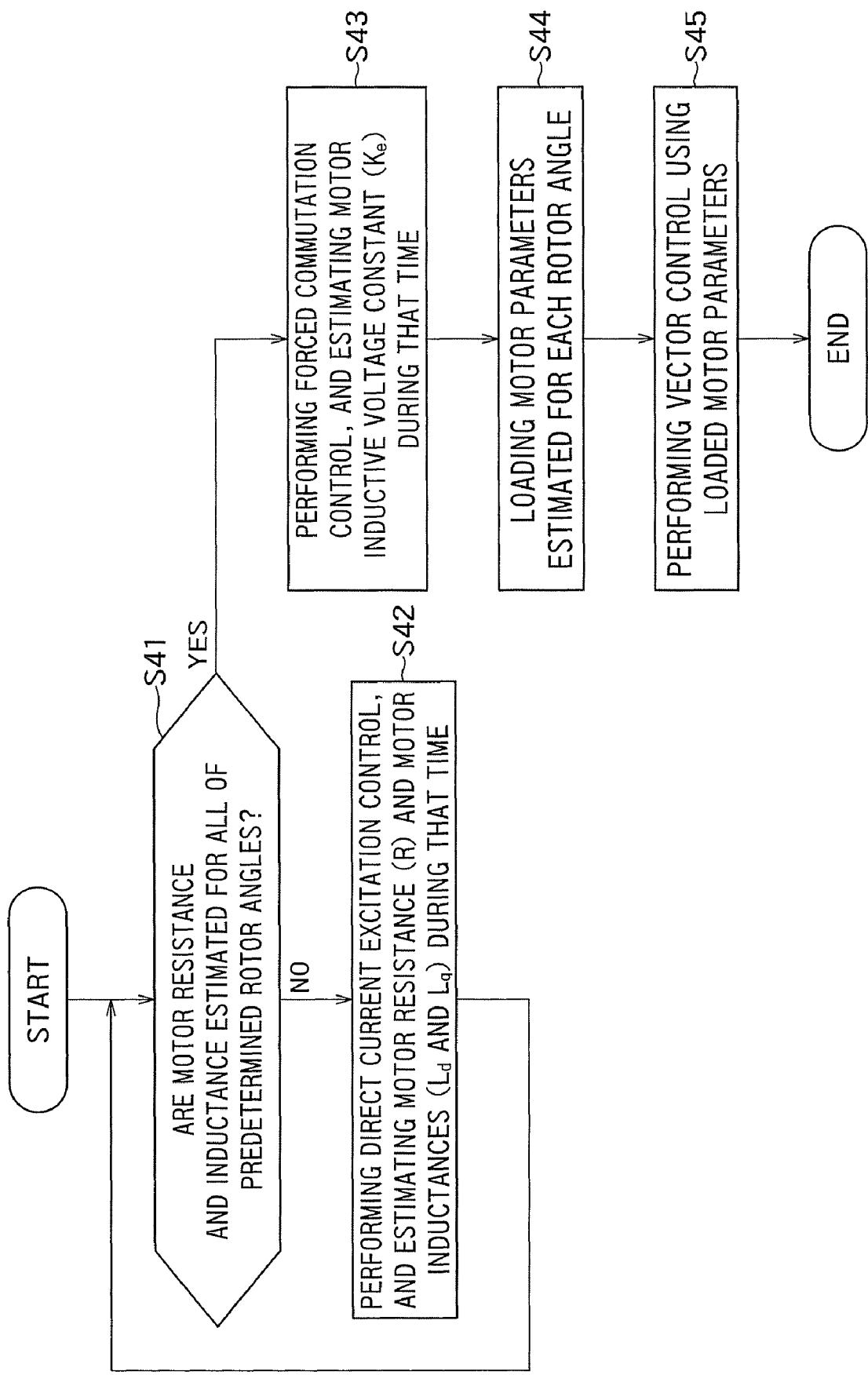
FIG. 17 is a flowchart which describes a motor drive method according to the seventh modified example of the present invention.

The operational flow of the motor drive apparatus according to the present modified example is illustrated in FIG. 17. In the following, the operational flow will be described along FIG. 17.

(1) First, the parameter estimation unit 14 determined whether or not the motor resistance and the motor inductance are estimated for all of the predetermined rotor angles, and then, it proceeds to step S43 when the estimation has been performed for all of the rotor angles. Otherwise, it proceeds to step S42 (step S41). The predetermined rotor angles θ are 0°, 60°, 120°, 180°, 240° and 300°, for example.

(2) When the estimation of the motor resistance and the motor inductance are not performed for all of the predetermined rotor angles, the parameter estimation unit 14 performs the direct current excitation control, and during that time, estimates the motor resistance R and the motor inductances $L_d$ and $L_q$ (step S42). As being similar to the abovementioned step S11, detailed description of this step will not be repeated.

(3) When the estimation of the motor resistance and the motor inductance has been performed for all of the predetermined rotor angles, the parameter estimation unit 14 performs the forced commutation control, and during that time, estimates the motor inductive voltage constant $K_e$ (step S43). As being similar to the abovementioned step S12, detailed description of this step will not be repeated.

(4) The parameter estimation unit 14 loads the motor resistance R and the motor inductances $L_d$, $L_q$ estimated for each rotor angle and the motor inductive voltage constant $K_e$ to the controller 13 (step S44).

(5) The controller 13 performs the vector control using the loaded motor parameters (step S45). At that time, the controller 13 changes the motor inductance value to be used based on the position-estimated rotor angle. Here, the controller 13 may acquire the motor inductance value at the rotor angle other than the predetermined angles (i.e., θ=0°, 60°, 120°, 180°, 240°, or 300° by interpolation.

According to the present modified example, since the vector control is preformed taking rotor angle dependency of a motor parameter into consideration, the control performance such as uniformity of the angular speed $ω_m$ can be further improved.

Here, it is also possible that the parameter estimation unit 14 acquires values of the motor resistance and the motor inductance at a rotor angle other than the abovementioned predetermined rotor angles by interpolation and loads the values to the controller 13.

Further, in the case that it is difficult to change the motor inductance in real time during the vector control, averaged values of the motor resistance R and the motor inductances $L_d$ and $L_q$ acquired for a plurality of rotor angles are respectively acquired in advance. Then, the vector control may be performed using the averaged value of the motor resistance and the averaged value of the motor inductance. By simply using the averaged value, the control performance can be improved compared to the case of using motor parameters for a single rotor angle.

Further, in the above description, the values are to be changed based on the rotor angle for both the motor resistance and the motor inductance. However, not limited to this, it is also possible that the values are changed based on the rotor angle only for the motor inductance, while the values for a single rotor angle are used for the motor resistance.

Further, the present modified example may be combined with the fifth modified example or the sixth modified example. That is, the motor parameters estimated along with the rotor angles may be stored in the non-volatile memory 90. With this configuration, since the estimation of the motor parameters can be eliminated at the second time of starting or after, the activation time from turning on the power until performing the vector control can be shortened.

Up to this point, the embodiment and the modified examples thereof according to the present invention are described. In the description of the above embodiment and the modified examples, the estimating and loading of the motor parameters are performed having the powering of the motor drive apparatus as a trigger. However, not limited to this, it is also possible that the estimating and loading of the motor parameters are performed having a command input by an operator or a signal from a timer arranged at the inside or the outside of the motor drive apparatus as a trigger.

Additional advantages and modifications will readily occur to those skilled in the art.

Therefore, the invention in its broader aspects is not limited to the specific details and representative embodiments shown and described herein.

Accordingly, various modifications may be made without departing from the spirit or scope of the general inventive concepts as defined by the appended claims and their equivalents.

What is claimed is:

1. A motor drive apparatus to perform vector control of a motor which includes a stator having a u-phase coil, a v-phase coil and a w-phase coil and a rotor having a permanent magnet fixed thereto, comprising:

an A/D converter which acquires a first motor current constituted with a u-phase motor current, a v-phase motor current and a w-phase motor current flowing respectively through the u-phase coil, the v-phase coil and the w-phase coil and which respectively digitalizes the u-phase motor current, the v-phase motor current and the w-phase motor current;

a vector control unit which generates a second motor current constituted with a d-axis motor current and a q-axis motor current by performing coordinate conversion to convert from a uvw-coordinate system into a dq-coordinate system on the first motor current digitalized by the A/D converter; and which acquires a first motor voltage constituted with a d-axis motor voltage and a q-axis motor voltage based on the second motor current, a motor parameter, and a desired angular speed of the rotor; and which generates a second motor voltage constituted with a u-phase motor voltage, a v-phase motor voltage and a w-phase motor voltage by performing reverse conversion of the first coordinate conversion on the first motor voltage; the motor parameter including a motor resistance, a d-axis motor inductance, a q-axis motor inductance and a motor inductive voltage constant;

a PWM generator which generates a PWM signal for driving the motor based on the second motor voltage acquired by the vector control unit; and a parameter estimation unit which estimates the motor resistance, the d-axis motor inductance and the q-axis motor inductance based on a maximum peak value and a minimum peak value of the d-axis motor current and a maximum peak value and a minimum peak value of the q-axis motor current in a direct current excitation control state where the rotor of the motor is fixed at a predetermined rotor angle; and which estimates the motor inductive voltage constant based on a predetermined angular speed, the motor resistance, the d-axis motor inductance and the q-axis motor inductance in a forced commutation control state where the rotor of the motor is rotating at the predetermined angular speed; and which loads the estimated motor parameter to the vector control unit.

2. The motor drive apparatus according to claim 1, wherein the parameter estimation unit acquires the motor resistance with any one of the following expressions:

$$R=2A(I_t^{D/(1-D)}-I_b^{D/(1-D)})/(I_t^{1/(1-D)}-I_b^{1/(1-D)})$$

$$R=2A(I_t^D-I_b^D)/(I_t-I_b) \text{ when } D \ll 1$$

$$R=2AD((I_t+I_b)/2)^{-1} \text{ when } D \ll 1$$

where 2A and D respectively denote an amplitude and a duty ratio of the d-axis motor voltage or the q-axis motor voltage, and $I_t$ and $I_b$ respectively denote the maximum peak value and the minimum peak value of the d-axis motor current or the q-axis motor current.

3. The motor drive apparatus according to claim 2, wherein the parameter estimation unit acquires the d-axis motor inductance and the q-axis motor inductance with any one of the following expressions:

$$L=R(1-D)T/(\log(I_t)-\log(I_b))$$

$$L=R(1-D)T/2 \tan h^{-1}((I_t-I_b)/(I_t+I_b))$$

$$L=RT/4 \tan h^{-1}((R/A)(I_t-I_b)/2) \text{ when } D=0.5$$

where R denotes the motor resistance and T denotes a cycle of the d-axis motor voltage or the q-axis motor voltage.

4. The motor drive apparatus according to claim 3, wherein the parameter estimation unit acquires the motor inductive voltage constant with the following expression:

$$K_e=(V_q-RI_q-L_q(dI_q/dt)-\omega_m L_d I_d)/\omega_m$$

where $V_q$ denotes the q-axis motor voltage, $I_q$ denotes the q-axis motor current, $I_d$ denotes the d-axis motor current, $L_q$ denotes the q-axis motor inductance, $L_d$ denotes the d-axis motor inductance, and $\omega_m$ denotes the angular speed in the forced commutation control state.

5. The motor drive apparatus according to claim 1,
wherein the A/D converter, in the direct current excitation control state, acquires a maximum peak value of the d-axis motor current or the q-axis motor current by reading a value of the first motor current at timing of a falling edge of the d-axis motor voltage or the q-axis motor voltage, and acquires a minimum peak value of the d-axis motor current or the q-axis motor current by reading a value of the first motor current at timing of a rising edge of the d-axis motor voltage or the q-axis motor voltage.

6. The motor drive apparatus according to claim 1, further comprising a peak value output circuit including:
a coordinate conversion circuit which generates an analog d-axis motor current and an analog q-axis motor current by performing the coordinate conversion on the first motor current;
a first top-peak hold circuit which holds the maximum value of the analog d-axis motor current and outputs as a first maximum value;
a first bottom-peak hold circuit which holds the minimum value of the analog d-axis motor current and outputs as a first minimum value;
a second top-peak hold circuit which holds the maximum value of the analog q-axis motor current and outputs as a second maximum value;
a second bottom-peak hold circuit which holds the minimum value of the analog q-axis motor current and outputs as a second minimum value; and
an A/D converter which digitalizes the first maximum value, the first minimum value, the second maximum value and the second minimum value, respectively, and outputs to the parameter estimation unit,
wherein the parameter estimation unit uses the first maximum value, the first minimum value, the second maximum value and the second minimum value which are input from the A/D converter of the peak value output circuit as the maximum peak value of the d-axis motor current, the minimum peak value of the d-axis motor current, the maximum peak value of the q-axis motor current and the minimum peak value of the q-axis motor current, respectively.

7. The motor drive apparatus according to claim 1, further comprising a mean value output circuit including:
a coordinate conversion circuit which generates an analog d-axis motor current and an analog q-axis motor current by performing the coordinate conversion on the first motor current;
a low-pass filter which outputs a time mean value of the analog d-axis motor current and/or a time mean value of the analog q-axis motor current; and
an A/D converter which digitalizes the time mean value of the analog d-axis motor current and/or the analog q-axis motor current, and outputs to the parameter estimation unit,
wherein the parameter estimation unit estimates the motor resistance with the following expression:

$$R=2AD/\bar{I}$$

where 2A and D respectively denote an amplitude and a duty ratio of the d-axis motor voltage or the q-axis motor voltage, $\bar{I}$ denotes the digitalized time mean value.

8. The motor drive apparatus according to claim 1, further comprising:
a first amplifier which amplifies difference between the u-phase motor current and a first offset within a range not to exceed an input range of the A/D converter, and outputs to the A/D converter;
a second amplifier which amplifies difference between the v-phase motor current and a second offset within a range not to exceed an input range of the A/D converter, and outputs to the A/D converter; and
a third amplifier which amplifies difference between the w-phase motor current and a third offset within a range not to exceed an input range of the A/D converter, and outputs to the A/D converter.

9. The motor drive apparatus according to claim 1, further comprising a non-volatile memory which stores the motor parameter estimated by the parameter estimation unit,
wherein the parameter estimation unit estimates the motor parameter and stores the estimated motor parameter in the non-volatile memory when the motor parameter is not stored in the non-volatile memory, and loads the motor parameter stored in the non-volatile memory to the vector control unit without estimating the motor parameter when the motor parameter is stored in the non-volatile memory.

10. The motor drive apparatus according to claim 9,
wherein the motor parameter includes the d-axis motor inductances and the q-axis motor inductances which are estimated for a plurality of rotor angles, and
the vector control unit acquires the first motor voltage using the d-axis motor inductance and the q-axis motor inductance corresponding to the position-estimated rotor angle.

11. The motor drive apparatus according to claim 1, further comprising a non-volatile memory which stores the motor parameter associated with temperature of the motor, the motor parameter being estimated by the parameter estimation unit,
- wherein the parameter estimation unit acquires the temperature of the motor measured by a temperature sensor arranged at the motor, estimates the motor parameter and stores the estimated motor parameter in the non-volatile memory being associated with the temperature when the motor parameter corresponding to the temperature is not stored at the non-volatile memory, and loads the motor parameter corresponding to the temperature stored in the non-volatile memory to the vector control unit without estimating the motor parameter when the motor parameter corresponding to the temperature is stored in the non-volatile memory.

12. The motor drive apparatus according to claim 11,
- wherein the motor parameter includes the d-axis motor inductances and the q-axis motor inductances which are estimated for a plurality of rotor angles, and
- the vector control unit acquires the first motor voltage using the d-axis motor inductance and the q-axis motor inductance corresponding to the position-estimated rotor angle.

13. The motor drive apparatus according to claim 1, further comprising a non-volatile memory which stores the motor parameter associated with temperature of the motor, the motor parameter being estimated by the parameter estimation unit,
- wherein the parameter estimation unit acquires a first temperature of the motor measured by a temperature sensor arranged at the motor, estimates the motor parameter corresponding to the first temperature by interpolation and loads the estimated motor parameter to the vector control unit provided that the motor parameters corresponding to a second temperature and a third temperature sandwiching the first temperature are stored even in the case that the motor parameter corresponding to the first temperature is not stored in the non-volatile memory.

14. The motor drive apparatus according to claim 1,
- wherein the parameter estimation unit estimates the d-axis motor inductance and the q-axis motor inductance for a plurality of rotor angles, and loads the estimated d-axis motor inductance and q-axis motor inductance for the respective rotor angles to the vector control unit, and
- the vector control unit acquires the first motor voltage using the d-axis motor inductance and the q-axis motor inductance corresponding to the position-estimated rotor angle.

15. The motor drive apparatus according to claim 1,
- wherein the parameter estimation unit estimates the d-axis motor inductance and the q-axis motor inductance for a plurality of rotor angles, acquires an averaged value of the estimated d-axis motor inductances and an averaged value of the estimated q-axis motor inductances for the plurality of rotor angles, and loads the acquired averaged value of the d-axis motor inductances and the acquired averaged value of the q-axis motor inductances to the vector control unit, and
- the vector control unit acquires the first motor voltage using the averaged value of the d-axis motor inductances and the averaged value of the q-axis motor inductances.

16. A drive method of a motor which includes a stator having a u-phase coil, a v-phase coil and a w-phase coil and a rotor having a permanent magnet fixed thereto, comprising:
- performing direct current excitation control to fix the rotor of the motor at a predetermined rotor angle;
- estimating a motor resistance, a d-axis motor inductance and a q-axis motor inductance during the direct current excitation control based on a maximum peak value and a minimum peak value of a d-axis motor current and a maximum peak value and a minimum peak value of a q-axis motor current;
- performing forced commutation control to rotate the rotor at a predetermined angular speed;
- estimating a motor inductive voltage constant during the forced commutation control based on the predetermined angular speed, the motor resistance, the d-axis motor inductance and the q-axis motor inductance; and
- performing vector control of the motor using a motor parameter which is constituted with the motor resistance, the d-axis motor inductance, the q-axis motor inductance and the motor inductive voltage constant which are estimated.

17. The motor drive method according to claim 16, further comprising storing the estimated motor parameter in a non-volatile memory, and performing vector control of the motor using the motor parameter stored in the non-volatile memory without estimating the motor parameter when a trigger for estimating and loading of the motor parameter for the next time is received.

18. The motor drive method according to claim 17, further comprising storing the estimated motor parameter in the non-volatile memory being associated with temperature of the motor measured by a temperature sensor arranged at the motor.

19. The motor drive method according to claim 16, further comprising:
- estimating the d-axis motor inductance and the q-axis motor inductance for a plurality of rotor angles; and
- performing vector control of the motor using the d-axis motor inductance and the q-axis motor inductance corresponding to the position-estimated rotor angle.

20. The motor drive method according to claim 19, further comprising storing the d-axis motor inductances and the q-axis motor inductances which are estimated for a plurality of rotor angles in a non-volatile memory, and performing vector control of the motor using the d-axis motor inductances and the q-axis motor inductances stored in the non-volatile memory when a trigger for estimating and loading of the motor parameter for the next time is received.

* * * * *